(12) United States Patent
Wu

(10) Patent No.: US 12,112,170 B2
(45) Date of Patent: Oct. 8, 2024

(54) REGISTER UPDATE METHOD

(71) Applicant: ESPRESSIF SYSTEMS (SHANGHAI) CO., LTD., Shanghai (CN)

(72) Inventor: Cheng'en Wu, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 51 days.

(21) Appl. No.: 18/031,128

(22) PCT Filed: Jun. 29, 2021

(86) PCT No.: PCT/CN2021/103224
§ 371 (c)(1),
(2) Date: Apr. 10, 2023

(87) PCT Pub. No.: WO2022/073362
PCT Pub. Date: Apr. 14, 2022

(65) Prior Publication Data
US 2023/0385064 A1    Nov. 30, 2023

(30) Foreign Application Priority Data

Oct. 10, 2020  (CN) .......................... 202011081318.9

(51) Int. Cl.
*G06F 9/30* (2018.01)
(52) U.S. Cl.
CPC .................................. *G06F 9/3013* (2013.01)

(58) Field of Classification Search
CPC .... G06F 9/3013; G06F 13/28; G06F 13/4282; G06F 9/30098
See application file for complete search history.

(56) References Cited

U.S. PATENT DOCUMENTS 6,532,533 B1 *   3/2003  Bhandal .............. G06F 9/30101
                                                          712/E9.019
7,219,167 B2 *   5/2007  Quach .................. G06F 9/4411
                                                          713/1

(Continued)

FOREIGN PATENT DOCUMENTS

CN         1329304 A      1/2002
CN       101290567 A     10/2008

(Continued)

*Primary Examiner* — Farley Abad
(74) *Attorney, Agent, or Firm* — Aird & McBurney LP

(57) ABSTRACT

A method of updating registers, including: providing a bitmap register; providing a target register; establishing a mapping between each bit in the bitmap register and a corresponding target content block in the target register; providing a register update instruction, the register update instruction including: one or more flag bits at specified locations, wherein each flag bit corresponds to a bit in the bitmap register, indicating whether the target content block corresponding to the bit needs to be updated; wherein for each target content block indicated by the bit that needs to be updated, the register update instruction further comprises a new content of the target content block or a source of the new content; writing the one or more flag bits in the register update instruction into the bitmap register; and executing the register update instruction to update the target content blocks.

10 Claims, 10 Drawing Sheets

(56) References Cited

U.S. PATENT DOCUMENTS

| | | | |
|---|---|---|---|
| 8,234,489 B2* | 7/2012 | Williamson | G06F 9/3891 713/165 |
| 2002/0007450 A1 | 1/2002 | Witt et al. | |
| 2004/0133767 A1* | 7/2004 | Chaudhry | G06F 9/3842 712/225 |
| 2006/0047885 A1 | 3/2006 | Pan et al. | |
| 2006/0095559 A1* | 5/2006 | Mangan | G06F 9/3879 709/224 |
| 2010/0217945 A1* | 8/2010 | Ge | G06F 9/384 711/E12.078 |
| 2016/0132445 A1* | 5/2016 | Birsan | G06F 13/287 710/308 |
| 2019/0146700 A1* | 5/2019 | Gschwind | G06F 9/30043 711/170 |

FOREIGN PATENT DOCUMENTS

| | | |
|---|---|---|
| CN | 101819518 A | 9/2010 |
| CN | 104281413 A | 1/2015 |
| CN | 105138308 A | 12/2015 |
| CN | 109921806 A | 6/2019 |
| CN | 109923518 A | 6/2019 |
| CN | 112052041 A | 12/2020 |
| CN | 112052213 A | 12/2020 |

* cited by examiner

REGISTER UPDATE METHOD

CROSS-REFERENCE TO RELATED APPLICATIONS

This application is the U.S. National Phase Application under 35 U.S.C. § 371 of International Patent Application No. PCT/CN2021/103224 filed on Jun. 29, 2021, which claims priority to Chinese Patent Application CN202011081318.9 filed on Oct. 10, 2020. The disclosures of the aforementioned applications are hereby incorporated by reference in their entireties.

TECHNICAL FIELD

The present disclosure belongs to the field of SoC integrated circuit design, and in particular relates to a register update method.

BACKGROUND

SPI (Serial Peripheral Interface) is a synchronous serial transmission interface proposed by Motorola, mainly used for communication between microcontrollers and peripheral devices, and for communication between microcontrollers. It has the characteristics of simple circuitry implementation, less bus pins, faster transmission rate, and so on.

The traditional SPI interface includes 4 signal lines: SS (Slave Select), SCK (SPI Clock), MOSI (Master Output/Slave Input) and MISO (Master Input/Slave Output).

With the development of SPI interface technology, people put forward increasing demands for data reliability and throughput rate of SPI interface, and the transmission speed of a mainstream SPI memory exceeds 100 MB/s. For example, GigaDevice's parallel 8 data channel flash memory has reached a rate of 200 MB/s. SPI communication with multiple data channels, high speed and high reliability enables SoC (System on Chip) chips to quickly access an external memory. This can reduce the memory size inside the SoC chip, and reduce the area and power consumption of the SoC chip, thereby greatly improving the performance of the embedded system.

However, there are numerous operating configurations for SPI transmission, such as that different SPI interface devices require different SPI interface clock modes, data sampling modes, full-duplex/half-duplex communication modes, and control modes, and also that different SPI memories support different data channel modes (such as 1/2/4/8 bit data channel modes), and therefore the compatibility issues of SPI interface devices cannot be ignored. In addition, in SPI communication, the adjustment of the operating configuration of the SPI controller by the CPU will increase the overhead of the CPU, thereby affecting the performance of the CPU. In particular, the inventors noticed that when the SPI controller in the existing art switches between different operating configurations, the adjustment of the operating configuration of the SPI controller by the CPU causes too long waiting time between successive transmissions, thereby creating a significant bottleneck on transmission continuity and speed of multiple SPI transmissions.

As can be seen, the requirement for flexible configuration and compatibility of the SPI controller and the requirement for SPI transmission continuity and transmission speed are a pair of contradictions in the existing art that need to be resolved urgently. After research, the inventors found that the SPI controller solutions in the existing art often focused on one aspect of compatibility or transmission speed, but failed to take into account both aspects.

For example, Chinese Patent No. CN101819560B proposes a method and device for executing program in SPI interface memory, which adopts a state machine including 6 working states to realize compatibility with various types of multi-channel (such as single-channel, double-channel, four-channel) SPI interface memory instructions. This solution is limited to SPI interface memory, does not involve compatibility with more types of SPI interface devices, and does not take into account the optimization of SPI transmission continuity.

As another example, Chinese Patent Application Publication No. CN103064805A proposes a method in which the SS (Slave Select) is controlled by the SPI host controller and the CPU can choose whether to read the received cached data, but this fails to meet the CPU's requirement for the SPI interface throughput rate. This solution fails to take into account and address the synergistic optimization of the flexible configuration of SPI controller, compatibility and SPI transmission continuity.

For another example, Chinese Patent No. CN104809094B proposes a scheme of adding cache to the input and adding delay to the output, but mainly for the case of single data channel, such as MOSI or MISO. This solution also fails to take into account and address the synergistic optimization of flexible configuration and compatibility of the SPI controller and SPI transmission continuity.

Therefore, there is a need in the art for an SPI controller and an operating method thereof, which can at least provide one or more of the following desired benefits: (1) providing more flexible configuration for the SPI controller, and further increasing the compatibility of the SPI controller; (2) improving the continuity of SPI transmission and the speed of multiple SPI transmissions; and (3) considering and solving the synergistic optimization of the flexible configuration of SPI controller, compatibility and SPI transmission continuity.

In addition, the inventors also note that in one scenario, when an SPI controller according to the existing art is used for continuous transmission in an embedded device (such as a microcontroller MCU), the CPU has to, on one hand, enter into an "Idle" state between two consecutive SPI transmissions, and on the other hand, has to update the contents of the entire register group in the SPI controller, so as to avoid that the remaining values in the register group used for the last SPI transmission causing confusion of the current SPI transmission state. Updating or resetting the entire register group by the CPU further imposes an additional burden on the CPU, and is detrimental to the continuity of transmission. In another scenario, when the register groups of multiple modules (not limited to SPI controller) in an embedded device need to be updated to configure the functions of each module or modify the state thereof, in the existing art, CPU resources are also occupied to update the register group of each module, and it is also desired the ability to update the register groups of multiple modules easily, reliably, and in batches.

Therefore, there is also a need in the art for a method of updating registers, which can at least provide one or more of the following desired benefits: (1) quickly and reliably updating register groups in embedded devices; (2) updating register groups with minimal or no CPU resources; and (3) conveniently updating the register groups of multiple modules in batches.

It should be understood that the technical problems listed above are only examples rather than limitations of the disclosure, and the disclosure is not limited to technical solutions that simultaneously solve all the above technical problems. The technical solutions of the disclosure may be implemented to solve one or more of the above or other technical problems.

SUMMARY OF THE INVENTION

To achieve the above objectives, in one aspect of the present disclosure, an SPI controller is provided, including: an SPI clock signal generator configured to generate SPI clock signal; a register group configured to store SPI operating configuration of the SPI controller; a plurality of SPI pins configured to connect to one or more SPI peripherals; an input/output controller configured to perform data input or output between the SPI controller and the SPI peripherals according to the SPI clock signal and the SPI operating configuration; and an SPI state machine configured to control a working state of the SPI controller. The SPI controller is electrically coupled via a bus to a CPU, a DMA controller and a system memory located outside the SPI controller. The input/output controller is further configured to receive an updated SPI operating configuration from the DMA controller and update the updated SPI operating configuration into the register group between two consecutive SPI transmissions.

Optionally, the SPI controller also includes one or more of the following components: an SPI clock mode control module configured to adjust polarity and phase of an output clock signal; an input/output timing adjustment module configured to adjust the timing of SPI input/output; an SPI cache used for caching data that the SPI controller interacts with the SPI peripherals under the control of the CPU; and an interrupt control module used for the SPI controller to generate a corresponding interrupt after a specified transmission is completed, and to transmit the interrupt to the CPU via a bus.

Optionally, the plurality of SPI pins include one or more SPI chip select pins, one or more SPI clock pins, and one or more SPI input/output pins.

Preferably, the plurality of SPI pins further include an SPI command/data signal pin, an SPI frame frequency signal pin, an SPI line frequency signal pin, and an SPI display valid signal pin.

Preferably, the SPI controller is arranged in an embedded device, and the bus is an on-chip bus.

In another aspect of the present disclosure, a method of operating an SPI controller is provided, the SPI controller being electrically coupled to a CPU and a DMA controller via a bus, and electrically coupled to one or more SPI peripherals via a plurality of SPI pins, wherein the SPI controller includes a register group and is configured to be capable of operating in a CPU control mode or a DMA control mode, the method including: S1) determining one or more SPI operating configurations corresponding to each of the one or more SPI peripherals; S2) creating an SPI transmission plan, the SPI transmission plan including a plurality of SPI transmissions to the one or more SPI peripherals, an execution sequence of the plurality of SPI transmissions, and SPI operating configurations corresponding to each of the plurality of SPI transmissions, wherein the SPI controller executes each SPI transmission according to the corresponding SPI operating configuration; and S3) executing the created SPI transmission plan under the control of the DMA controller, wherein the plurality of SPI transmissions are executed according to the execution sequence, and the current SPI transmission is executed according to the corresponding SPI operating configuration, and wherein upon completion of an SPI transmission, the current SPI operating configuration is modified by the DMA controller to an SPI operating configuration corresponding to a next SPI transmission.

In the SPI controller and the method of operating the SPI controller according to the present disclosure, optionally, the SPI controller is operated according to an SPI state machine, the SPI state machine being configured to include the following states in a sequential cycle: an "Idle" state used for indicating that the SPI controller is in a non-working state; a "Configuration" state used for receiving an SPI operating configuration from the DMA controller by the input/output controller and updating the SPI operating configuration into the register group; a "Preparation" state used for controlling SPI chip select setup time; a "Command" state used for the SPI controller to send an SPI command and control the number of clock cycles that the SPI command lasts; an "Address" state used for the SPI controller to send an SPI address and control the number of clock cycles that the SPI address lasts; a "Waiting" state used for the SPI controller to control the number of clock cycles waiting for transmission of SPI valid data according to a requirement of an SPI slave device; an "Output" state used for the SPI controller to control the number of clock cycles for outputting data; an "Input" state used for the SPI controller to control the number of clock cycles for inputting data; and a "Done" state used for controlling the SPI chip select hold time.

In the SPI controller and the method of operating an SPI controller according to the present disclosure, optionally, each working state in the SPI state machine is configured to have a respective SPI operating configuration.

In the SPI controller and the method of operating an SPI controller according to the present disclosure, preferably, when the SPI controller is configured to operate in a CPU control mode, states other than the "Idle" state are configured to be skippable; and when the SPI controller operates in a DMA control mode, states other than the "Idle" state are configured to be skippable, and the "Idle" state is configured to be skippable to go directly from the "Done" state into the "Configuration" state.

In the SPI controller and the method of operating an SPI controller according to the present disclosure, optionally, the SPI operating configuration includes a combination of one or more of the following modes: a 1/2/4/8 data channel mode, an SPI clock mode, an SDR/DDR data sampling mode, a full-duplex/half-duplex communication mode.

In the method of operating the SPI controller according to the present disclosure, optionally, a DMA configuration linked list including one or more configuration nodes is provided, wherein each configuration node corresponds to one SPI transmission and includes an SPI operating configuration corresponding to the one SPI transmission and links to a transmitting data linked list linked to the one SPI transmission, the transmitting data linked list being linked to a next configuration node. The information of the SPI operating configuration is stored in an area in a DMA configuration buffer. Upon completion of an SPI transmission, the current SPI operating configuration is modified by the DMA controller to an SPI operating configuration corresponding to a next SPI transmission, which includes: reading the SPI operating configuration corresponding to the next SPI transmission from an area corresponding to a configuration node of the next SPI transmission in the DMA configuration buffer, and writing the SPI operating configuration into the register group.

Optionally, in response to that the one SPI transmission includes an "Output" state, the configuration node is linked to the transmitting data linked list for the one SPI transmission, and the transmitting data linked list is linked to the next configuration node; otherwise, the configuration node is directly linked to the next configuration node.

Optionally, the information of the SPI operating configuration includes a value of one or more registers corresponding to the SPI operating configuration.

Alternatively, the information of the SPI operating configuration includes a difference between a value of one or more registers corresponding to the SPI operating configuration of a current configuration node and a value of one or more registers corresponding to the SPI operating configuration of a previous configuration node in the DMA configuration linked list.

Optionally, each bit in one or more bits in a designated location in an area of the DMA configuration buffer corresponds to one of one or more registers which are corresponding to the SPI operating configuration of the current configuration node, indicating whether the value of the register has changed compared to the SPI operating configuration of the previous configuration node, the method preferably further includes that: when writing the SPI operating configuration into the register group, only the value of the register that has changed compared to the SPI operating configuration of the previous configuration node is updated.

Optionally, a plurality of bits in a designated location in an area in the DMA configuration buffer is set as an error check number, and an error check calibration reference number is provided inside the SPI controller; and only when the error check number and the error check calibration reference number conform to a pre-specified relationship, the SPI operating configuration corresponding to the next SPI transmission is read from an area in the DMA configuration buffer of the configuration node corresponding to the next SPI transmission, and the SPI operating configuration is written into the register group.

Optionally, when the SPI peripheral is an LCD, the following steps are performed: providing LCD output data, the LCD output data including a valid data area, an upper blank area, a lower blank area, a front blank area and a rear blank area; configuring the SPI state machine to enable the "Configuration" state in the front blank area, enable the "Output" state in the valid data area, and enable any state except the "Output" state and the "Idle" state in the upper blank area, the lower blank area and the rear blank area; loading the SPI operating configuration in the "Configuration" state; outputting the LCD output data one line at a time in the "Output" state.

In yet another aspect of the present disclosure, a method of updating registers is provided, including the steps of: providing one or more bitmap registers; providing one or more target registers; establishing a mapping between each bit in the one or more bitmap registers and a corresponding target content block in the one or more target registers; providing a register update instruction, the register update instruction including: one or more flag bits at a specified location, wherein each flag bit corresponds to a bit in the one or more bitmap registers, indicating whether the target content block corresponding to the bit needs to be updated; for each target content block indicated by the bit that needs to be updated, the register update instruction further including a new content of the target content block or a source of the new content; writing the one or more flag bits in the register update instruction into the one or more bitmap registers; executing the register update instruction by the update controller according to the bits in the one or more bitmap registers, so as to update the target content block in the one or more target registers, wherein only each target content block that needs to be updated as indicated by the bits is updated.

Optionally, the step of establishing a mapping between each bit in the one or more bitmap registers and the corresponding target content block in the one or more target registers includes: establishing a direct correspondence between each bit and the corresponding target content block in the one or more target registers.

Optionally, the size of the target content block is fixed, wherein establishing the direct correspondence between each bit and the corresponding target content block in the one or more target registers includes: establishing a correspondence between each bit and a start address of the corresponding target content block in the one or more target registers.

Optionally, it also includes providing one or more address mapping registers, each address mapping register including one or more sets of content block address information; wherein establishing a mapping between each bit in the one or more bitmap registers and the corresponding target content block in the one or more target registers includes: establishing a correspondence between each bit in the one or more bitmap registers and a set of content block address information in the one or more address mapping registers; and establishing a correspondence between the group of content block address information in the one or more address mapping registers and the corresponding target content block in the one or more target registers, wherein the corresponding target content block is located according to the content block address information.

Optionally, the content block address information includes a content block start address and a content block size.

Optionally, the content block address information includes a content block start address and a content block end address.

Optionally, the step of executing the register update instruction by the update controller according to the bits in the one or more bitmap registers to update the target content block in the one or more target registers, includes: for each bit in the one or more bitmap registers, locating the target content block corresponding to the bit according to the mapping; and in response to that the bit indicates the target content block corresponding to the bit needs to be updated, updating the target content block with the new content of the target content block.

Optionally, the one or more flag bits are located in a header of the register update instruction.

Optionally, the source of the new content includes one or more of memory, registers, and flash memory.

Optionally, the update controller is a module in an embedded device.

The SPI controller and the method of operating an SPI controller according to the present disclosure, can improve the throughput rate of the SPI interface, extend the versatility of the SPI controller, improve the utilization rate of the CPU, and improve the performance of the SoC system. In particular, the new continuous transmission mode according to the present disclosure can significantly improve the throughput rate of the SPI interface, extend the versatility of the SPI controller, and improve the utilization rate of the CPU, thereby significantly improving the performance of the SoC system.

As described above, the SPI controller according to the present disclosure, under the DMA-controlled segmented configuration transmission mode (hereinafter referred to as "DMA control mode"), can reconfigure the register group of the SPI controller in the "Configuration" state of each segment transmission, so that the operation mode of each segmented configuration transmission is independent of each other, and thus achieving a flexible and powerful continuous transmission mode. The DMA segmented configuration transmission requires only one CPU configuration to complete multiple SPI transmissions.

The method of updating registers according to the present disclosure can quickly and reliably update the register group in embedded devices, update the register group with minimal or no CPU resources, and conveniently update the register groups of multiple modules in batches.

BRIEF DESCRIPTION OF DRAWINGS

In the following, the disclosure will be further explained based on the embodiments with reference to the accompanying figures.

DETAILED DESCRIPTION

The embodiments of the present disclosure will be described below in detail with reference to the accompanying drawings and specific embodiments. It should be understood that the embodiments shown in the accompanying drawings and described hereinafter are only illustrative and not intended to limit the disclosure.

Figure 1:
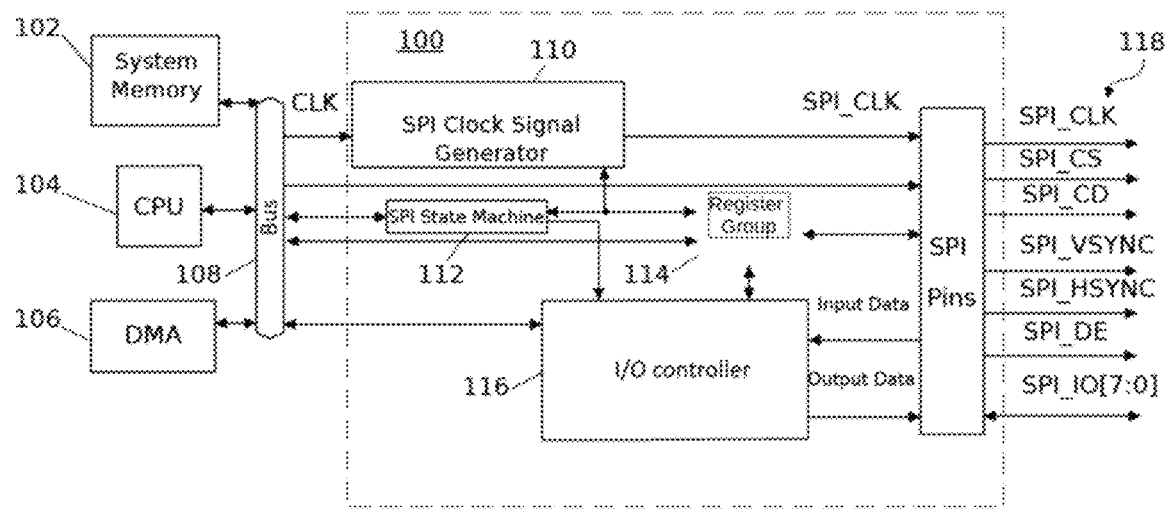
FIG. 1 schematically illustrates a structural diagram of an SPI controller according to an embodiment of the present disclosure.

In one embodiment of the present disclosure, as shown in FIG. 1, an SPI controller 100 is provided, including: an SPI clock signal generator 110, which is configured to generate an SPI clock signal SPI_CLK; a register group 114, which is configured to store SPI operating configurations of the SPI controller 100; a plurality of SPI pins 118, which are configured to connect to one or more SPI peripherals (not shown); and an input/output controller 116, which is configured to perform data input or output between the SPI controller 100 and the SPI peripherals according to the SPI clock signal and the SPI operating configuration; an SPI state machine 112, which is configured to control the working state of the SPI controller 100; wherein the SPI controller 100 is electrically coupled via a bus 108 to a CPU 104, a DMA controller 106 and a system memory 102 located outside the SPI controller; and the input/output controller 116 is further configured to receive an updated SPI operating configuration from the DMA controller 106 and update the updated SPI operating configuration into the register group 114 between two consecutive SPI transmissions.

Figure 2:
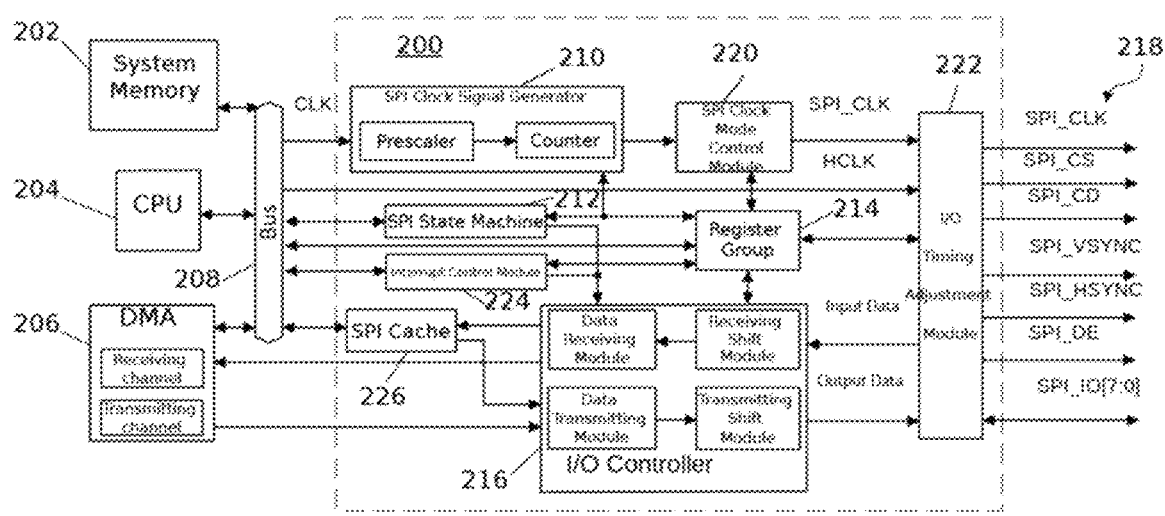
FIG. 2 schematically illustrates a detailed structural diagram of an SPI controller of an embodiment of the present disclosure.

In a detailed embodiment of the present disclosure, as shown in FIG. 2, an SPI controller 200 is provided, which mainly includes an SPI state machine 212, an SPI clock signal generator 210, an SPI clock mode control module 220, a register group 214, an input/output controller 216, an input/output timing adjustment module 222, an SPI cache 226, and an interrupt control module 224. The SPI controller 200 is connected to a CPU 204, a DMA controller 206 and a system memory 202 via a bus 208. As a non-limiting example, the specific connection relationships between each component can be as follows. The CPU 204 is connected with the SPI state machine 212, the register group 214, the interrupt control module 224 and the SPI cache 226 via the bus 208. The SPI clock signal generator 210 is connected with the bus 208, the SPI clock mode control module 220, the register group 214 and the SPI state machine 212. The SPI clock mode control module 220 is connected with the register group 214, and outputs an SPI clock signal SPI_CLK through the input/output timing adjustment module 222. The bus 208 passes a high frequency clock signal HCLK to the input/output timing adjustment module 222. The SPI state machine 212 is connected with the register group 214, controlled by the register group 214, and simultaneously connected with the SPI clock signal generator 210, the input/output controller 216, and the interrupt control module 224, to control the state of the transmission clock and data on the SPI interface, and generate corresponding interrupts. The interrupt control module 224 generates an interrupt under the control of the SPI state machine, and transmits the interrupt to the CPU 204 via the bus 208. The register group 214 is connected with the SPI state machine 212, the SPI clock signal generator 210, the SPI clock mode control module 220, the input/output controller 216, the input/output timing adjustment module 222, and the interrupt control module 224 respectively, to configure relevant registers in the register group 214. The input/output controller 216 is connected with the input/output timing adjustment module 222 and receives data from the SPI interface or sends data to the SPI interface, and is connected with SPI cache 226 to transmit data under the CPU control mode, and is further connected with the DMA controller 206 to transmit data under the DMA control mode. The DMA controller 206 is connected to the register group 214 via the bus 208 for configuring the register group 214.

As a non-limiting example, the SPI controller of the present disclosure includes the following SPI pins (indicated by reference numerals 118 in FIGS. 1 and 218 in FIG. 2, respectively) that constitute the SPI interface: an SPI chip select pin SPI_CS (corresponding to the slave select line SS), an SPI clock pin SPI_CLK (corresponding to the SPI clock line SCK), and a plurality of SPI input/output pins SPI_IO. In the embodiments of FIG. 1 and FIG. 2, eight SPI input/output pins SPI_IO[7:0] are shown, where SPI_IO[0] corresponds to the master output slave input line MOSI, and SPI_IO[1] corresponds to the master input slave output line MISO, and SPI_IO[7:2] are additionally provided so that the SPI controller of the present disclosure can support multiple data channel transmissions (such as 2/4/8 channel) at the hardware level. In a preferred embodiment, the SPI controller of the present disclosure also includes the following SPI pins: an SPI command/data signal pin SPI_CD, an SPI frame frequency signal pin SPI_VSYNC, an SPI line frequency signal pin SPI_HSYNC and an SPI display valid signal pin SPI_DE, so that the compatibility of the SPI controller of the present disclosure is extended at the hardware level to enable support of LCD (Liquid Crystal Display) interface peripherals and continuous LCD data transmission, such as support of LCD interface peripherals of Motorola 6800, Intel 8080 and/or parallel 8-bit RGB mode.

It should be understood that the bus shown in FIG. 1 and FIG. 2 may be an on-chip bus, including but not limited to an AMBA (Advanced Microcontroller Bus Architecture) bus. It should also be understood that the SPI controller according to the present disclosure can be arranged in a variety of embedded devices.

In the embodiments shown in FIG. 1 and FIG. 2, the SPI state machine 112 or 212 controls the states, the clock cycles of each state, and the jump direction of each state contained in the operation of the SPI controller 100 or 200. The operation of the SPI state machine will be described in detail below with reference to FIG. 3.

In the embodiment shown in FIG. 2, the SPI clock signal generator 210 includes a prescaler module and a counter module, which are used to generate a serial output SPI clock signal SPI_CLK with variable frequency according to a prescaler coefficient and a counter frequency division coefficient configured by the registers. It should be understood that the implementation of the present disclosure is not limited thereto, and the SPI clock signal generator 210 may be implemented to include different components to achieve the same or similar functions.

The SPI clock mode control module 220 is configured to adjust polarity and phase of the output clock signal SPI_CLK, so as to be compatible with the four timing types specified in the SPI protocol, that is, four different data transmission timings depending on the combination of CPOL (Clock Polarity) and CPHA (Clock Phase).

The register group 114 or 214 is used to configure the SPI controller to be in different operation modes, so as to realize various functions.

The input/output controller 116 or 216 is used to input or output corresponding data according to the state which the SPI state machine is in. Further, the input/output controller 116 or 216 is also configured to receive an updated SPI operating configuration from the DMA controller 106 or 206 and update the updated SPI operating configuration into the register group 114 or 214 between two consecutive SPI transmissions. In other words, the input/output controller 116 or 216 can update the SPI operating configuration in the register group 114 or 214 without CPU intervention.

The input/output timing adjustment module 222 is used to adjust the timing of the SPI interface, for example, by adding a delay to the data of input or output channel respectively, to adjust the sampling or transmitting timing of the data, so as to ensure the correct transmission of data.

According to an embodiment of the present disclosure, the SPI controller can be configured to be capable of operating in a CPU control mode or a DMA control mode. The SPI cache 226 is used to store data that the SPI controller interacts with the SPI peripherals in the CPU control mode. In the data reading operation controlled by the CPU, the CPU 204 configures the register group 214 of the SPI controller via the bus, and simultaneously writes the data to be sent into the SPI cache 226; the SPI controller 200 sends the data in the SPI cache 226 to the corresponding SPI peripheral (not shown) during operation. In the data writing operation controlled by the CPU, the CPU 204 first configures the register group 214 of the SPI controller 200; the SPI controller 200 stores the received data into the SPI cache 226 during operation; the CPU 204 can read the data in the SPI cache 226 via the bus after the SPI transmission is completed.

The interrupt control module 224 is used for the SPI controller 200 to generate a corresponding interrupt after the specified transmission is completed, and transmit the interrupt to the CPU 204 via the bus 208.

In the embodiment according to the present disclosure, the DMA controller 206 may be configured by the CPU 204 to implement data transmission between the SPI peripheral and the system memory 202 via the SPI controller 200. In particular, as described in detail below, according to an embodiment of the present disclosure, the DMA can be configured by the CPU only once to complete multiple SPI transmissions, in particular, multiple consecutive SPI transmissions.

In general, the CPU 204 implements controls of the SPI controller 200 and the DMA controller 206 via the bus 208.

Figure 3:
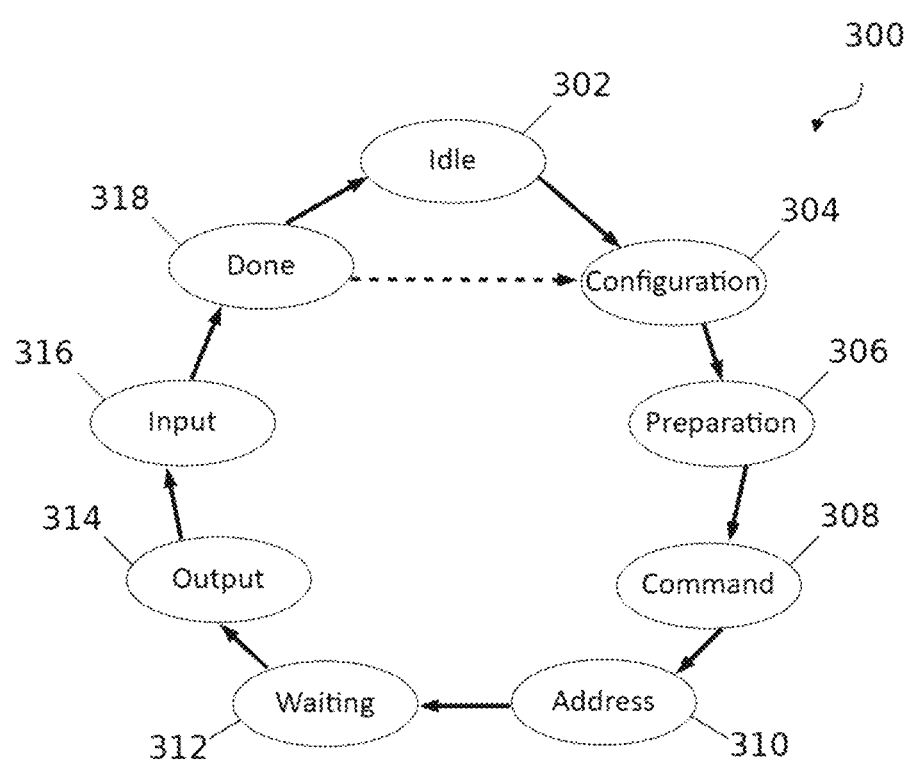
FIG. 3 schematically illustrates a jump diagram of a finite state machine of an SPI controller according to the present disclosure.

FIG. 3 schematically illustrates a state transition diagram 300 of a state machine of the SPI controller according to the present disclosure. In the context of the present disclosure, the functions of the SPI controller are implemented by configuring the SPI state machine and the register group. The state machine of the SPI controller jumps in the direction of the arrows in FIG. 3, and all states except the "Idle" state can be skipped directly. A user can choose to execute a specific state as needed, so as to realize different functions. Each state of the SPI state machine according to the present disclosure is described in detail below. In a preferred embodiment of the present disclosure, when the SPI controller is configured to operate in a CPU control mode, states other than the "Idle" state are configured to be skippable; and when the SPI controller is configured to operate in a DMA control mode, states other than the "Idle" state are configured to be skippable, and the "Idle" state is configured to be skippable to go directly from the "Done" state to the "Configuration" state.

1) The "Idle (IDLE)" state 302 is used to indicate that the SPI controller is in a non-working state. At this time, as a non-limiting example, the SPI clock pin SPI_CLK can remain at a low level or a high level depending on the four clock modes specified in the SPI protocol; the SPI chip select pin SPI_CS remains at a high level, and the SPI command/data signal pin SPI_CD, the SPI frame frequency signal pin SPI_VSYNC, the SPI line frequency signal pin SPI_HSYNC, the SPI display valid signal pin SPI_DE and the SPI input/output pins SPI_IO[7:0] are always at configurable fixed levels.

2) "Configuration (CONF)" state 304 is used for the SPI controller to fetch the corresponding data from the DMA transmission buffer (TX_buf) in the segmented configuration transmission mode controlled by the DMA and configure into the corresponding register in the register group through the input/output controller, so that the SPI controller can reconfigure the register group of the SPI controller before each segmented configuration transmission. Therefore, the specific mode of each segmented configuration transmission can be different, which is equivalent to that a DMA-controlled segmented configuration transmission includes multiple different SPI single transmissions, and can access different SPI peripherals at different times.

3) "Preparation (PREP)" state 306 is used to control the chip select setup time of the SPI to meet the timing requirements of the chip select setup time of each SPI peripheral. Moreover, the "Preparation" state is also used by the SPI controller to prepare commands, addresses and data to be sent.

4) "Command (CMD)" state 308 is used by the SPI controller to send an SPI command and control the number of clock cycles that the SPI command lasts.

5) "Address (ADDR)" state 310 is used for the SPI controller to send the SPI address and control the number of clock cycles that the SPI address lasts.

6) "Waiting (DUMMY)" state 312 is used by the SPI controller to control the number of clock cycles waiting for the transmission of SPI valid data according to the requirements of the SPI slave device.

7) "Output (DOUT)" state 314 is used for the SPI controller to control the number of clock cycles for outputting valid data. In the CPU control mode, the data sent is from the SPI cache; in the DMA control mode, the data sent is from the memory configured by the DMA configuration linked list or the DMA TX linked list.

8) "Input (DIN)" state 316 is used by the SPI controller to control the number of clock cycles for inputting valid data. In the CPU control mode, the input data is stored in the SPI cache; in the DMA control mode, the input data is stored in the memory configured by the DMA transmitting data linked list (TX linked list).

9) "Done (DONE)" state 318 is used to control the SPI chip select hold time to meet the timing requirements of the chip select hold time of each SPI peripheral. In a single SPI transmission mode, the next state of the SPI state machine is the "Idle" state. In the segmented configuration transmission mode controlled by the DMA, in response to that the next state which the SPI state machine is controlled to jump is the "Configuration" state, the segmented configuration transmission controlled by the DMA continues; in response to that the next state which SPI state machine is controlled to jump is the "Idle" state, the segmented configuration transmission controlled by the DMA ends and a corresponding interrupt is generated.

Based on the hardware implementation and control method of the present disclosure, the SPI controller according to the present disclosure can independently control 1/2/4/8 data channel modes of the SPI interface in the states of "Command", "Address", "Output" and "Input" in a single SPI transmission, can independently control the SDR (Single Data Rate, single data sampling) and DDR (Double Data Rate, double data sampling) data sampling modes of SPI_CLK of SPI clock signal in the states of "Command", "Address", "Output" and "Input", supports full-duplex and half-duplex transmissions, and supports CPU-controlled data transmissions and DMA-controlled data transmissions, so as to meet the timing requirements of most 1/2/4/8 channel and other multi-data channel SPI peripheral interfaces, which greatly improves the throughput rate of the SPI interface and greatly expands the versatility of the SPI controller. Moreover, through the timing adjustment module, the delay value of each data channel can be adjusted more finely, so as to ensure the correctness of data transmissions and improve the reliability of SPI data transmissions.

In an embodiment of the present disclosure, each working state in the SPI state machine can be configured to have a respective SPI operating configuration. The SPI operating configuration includes one or more of the following modes: 1/2/4/8 data channel mode, SPI clock mode, SDR/DDR data sampling mode, full-duplex/half-duplex communication mode.

It should be understood that each state of the state machine can be independently enabled or disabled, and the clock cycle of each state can also be independently configured. The state machine can be controlled by the enabled states and clock cycle lengths thereof. As described above, through the register group 114 or 214, the SPI controller can be configured to be in different operation modes, so as to realize various functions. For example, the current state of the SPI state machine, the operating configuration of the SPI controller, and the attributes of the SPI controller can all be reflected in the register values contained in the registers in the register group. Optionally, the current state of the SPI state machine, the operating configuration of the SPI controller, the attributes of the SPI controller, etc. can be changed by modifying the register values in the corresponding registers. As a non-limiting embodiment, the register group in the SPI controller according to the present disclosure may be configured to include, but not limited to, the registers shown in Table 1 below.

TABLE 1

Examples of registers

| Register Name | Description | Address Offset | Access |
| --- | --- | --- | --- |
| SPI_CMD | Command Control Register | 0x0000 | R/W |
| SPI_ADDR | Address Value Register | 0x0004 | R/W |
| SPI_CTRL | SPI Control Register | 0x0008 | R/W |
| SPI_CTRL1 | SPI Control Register 1 | 0x000C | R/W |
| SPI_CTRL2 | SPI Control Register 2 | 0x0010 | R/W |
| SPI_CLOCK | SPI Clock Control Register | 0x0014 | R/W |
| SPI_USER | SPI User Control Register | 0x0018 | R/W |
| SPI_USER1 | SPI User Control Register 1 | 0x001C | R/W |
| SPI_USER2 | SPI User Control Register 2 | 0x0020 | R/W |
| SPI_MOSI_DLEN | MOSI Length | 0x0024 | R/W |
| SPI_MISO_DLEN | MISO Length | 0x0028 | R/W |

TABLE 1-continued

Examples of registers

| Register Name | Description | Address Offset | Access |
|---|---|---|---|
| SPI_MISC | SPI MISC Register | 0x002C | R/W |
| SPI_SLAVE | SPI Slave Control Register | 0x0030 | Variable |
| SPI_FSM | SPI Master State and DMA Read Bit Control Register | 0x0044 | Variable |
| SPI_HOLD | SPI Holding Register | 0x0048 | R/W |
| SPI_DMA_INT_ENA | SPI DMA Interrupt Enable Register | 0x0058 | R/W |
| SPI_DMA_INT_RAW | SPI DMA Raw Interrupt Register | 0x005C | Variable |
| SPI_DMA_INT_CLR | SPI DMA Interrupt Clear Register | 0x0064 | R/W |
| SPI_DIN_MODE | SPI Input Delay Mode Configuration | 0x00E0 | R/W |
| SPI_DIN_NUM | SPI Input Delay Number Register | 0x00E4 | R/W |
| SPI_DOUT_MODE | SPI Output Delay Mode Configuration | 0x00E8 | R/W |
| SPI_DOUT_NUM | SPI Output Delay Number Register | 0x00EC | R/W |
| SPI_LCD_CTRL | LCD Frame Control Register | 0x00F0 | R/W |
| SPI_LCD_CTRL1 | LCD Frame Control Register 1 | 0x00F4 | R/W |
| SPI_LCD_CTRL2 | LCD Frame Control Register 2 | 0x00F8 | R/W |
| SPI_LCD_D_MODE | LCD Delay Mode | 0x00FC | R/W |
| SPI_LCD_D_NUM | LCD Delay Number | 0x0100 | R/W |

Further, it should be understood by those skilled in the art that the SPI state machine, as well as the state and operation of the SPI controller, can be controlled by the register values in the registers. It should be understood that register values may be read-only, read-write (R/W), or variable (i.e., may be configured to be read-only or read-write). As a non-limiting example, the register values of the registers in the SPI controller according to the present disclosure can be configured to include, but not limited to, the register values such as those shown in Table 2 below.

TABLE 2

Examples of Register Values

| Register | Register value | Description |
|---|---|---|
| SPI_CTRL | SPI_FADDR_DUAL | Apply 2-bit mode in the "Address" state, 1: enabled, 0: disabled. Can be configured (R/W) in the "Configuration" state |
| SPI_CTRL | SPI_FADDR_OCT | Apply 8-bit mode in the "Address" state, 1: enabled, 0: disabled. Can be configured (R/W) in the "Configuration" state |
| SPI_CTRL | SPI_FADDR_QUAD | Apply 4-bit mode in the "Address" state, 1: enabled, 0: disabled. Can be configured (R/W) in the "Configuration" state |
| SPI_CTRL | SPI_FCMD_DUAL | Apply 2-bit mode in the "Command" state, 1: enabled, 0: disabled. Can be configured (R/W) in the "Configuration" state |
| SPI_CTRL | SPI_FCMD_OCT | Apply 8-bit mode in the "Command" state, 1: enabled, 0: disabled. Can be configured (R/W) in the "Configuration" state |
| SPI_CTRL | SPI_FCMD_QUAD | Apply 4-bit mode in the "Command" state, 1: enabled, 0: disabled. Can be configured (R/W) in the "Configuration" state |
| SPI_CTRL | SPI_FREAD_DUAL | Apply 2-bit mode in the "Read Data" state, 1: enabled, 0: disabled. Can be configured (R/W) in the "Configuration" state |
| SPI_CTRL | SPI_FREAD_OCT | Apply 8-bit mode in the "Read Data" state, 1: enabled, 0: disabled. Can be configured (R/W) in the "Configuration" state |

TABLE 2-continued

Examples of Register Values

| Register | Register value | Description |
| --- | --- | --- |
| SPI_CTRL | SPI_FREAD_QUAD | Apply 4-bit mode in the "Read Data" state, 1: enabled, 0: disabled. Can be configured (R/W) in the "Configuration" state |
| SPI_USR | SPI_FWRITE_DUAL | Apply 2-bit mode in the "Write Data" state, 1: enabled, 0: disabled. Can be configured (R/W) in the "Configuration" state |
| SPI_USR | SPI_FWRITE_OCT | Apply 8-bit mode in the "Write Data" state, 1: enabled, 0: disabled. Can be configured (R/W) in the "Configuration" state |
| SPI_USR | SPI_FWRITE_QUAD | Apply 4-bit mode in the "Write Data" state, 1: enabled, 0: disabled. Can be configured (R/W) in the "Configuration" state |
| SPI_USR | SPI_CS_SETUP | Enable the "Preparation" state of SPI operation. Can be configured (R/W) in the "Configuration" state |
| SPI_USR | SPI_USR_COMMAND | Enable the "Command" state of SPI operation. Can be configured (R/W) in the "Configuration" state |
| SPI_USR | SPI_USR_ADDR | Enable the "Address" state of SPI operation. Can be configured (R/W) in the "Configuration" state |
| SPI_USR | SPI_USR_DUMMY | Enable the "Waiting" state of SPI operation. Can be configured (R/W) in the "Configuration" state |
| SPI_USR | SPI_USR_DIN | Enable the "Input" state of SPI operation. Can be configured (R/W) in the "Configuration" state |
| SPI_USR | SPI_CS_HOLD | Enable the "Done" state of SPI operation. Can be configured (R/W) in the "Configuration" state. |
| SPI_USR | SPI_USR_DOUT | Enable the "Output" state of SPI operation. Can be configured (R/W) in the "Configuration" state |
| SPI_USER1 | SPI_USR_DUMMY_CYCLELEN | The length of the "Waiting" state, in unit of number of SPI clock cycles. Can be configured (R/W) in the "Configuration" state. |
| SPI_USER1 | SPI_USR_ADDR_BITLEN | The length of the "Address" state, in unit of bits. Can be configured (R/W) in the "Configuration" state. |
| SPI_USER2 | SPI_USR_COMMAND_BITLEN | The length of the "Command" state, in unit of bits. |
| SPI_USER2 | SPI_USR_COMMAND_VALUE | The value of the command. Can be configured (R/W) in the "Configuration" state. |
| SPI_ADDR | SPI_USR_ADDR_VALUE | Bits [31:8] are the address of the slave, bits [7:0] are reserved. |
| SPI_MISO_DLEN | SPI_USR_MISO_DBITLEN | The length of the read data, in unit of bits. |
| SPI_MOSI_DLEN | SPI_USR_MOSI_DBITLEN | The length of the written data, in unit of bits. |

The following Table 3 and Table 4 list, in non-limiting embodiments, the register values are controlled by the SPI controller according to the present disclosure for the 1/2/4/8 data channel modes, corresponding values, and the number of clock cycles that lasts in the "Command", "Address", "Waiting", "Input" and "Output" states respectively, the register values being contained in registers in the register group. The control of each state is independent of each other, so that SPI transmission in almost any 1/2/4/8 data channel mode can be realized. It should be understood that in the context of this disclosure, "1/2/4/8 data channel mode" refers to a mode of using 1, 2, 4 or 8 data channels for SPI transmission. Here, each data channel corresponds to one SPI input/output pin, and each data channel transmits 1 bit of data at a time.

TABLE 3

Command configuration table for 1 data channel/2 data channel mode

| SPI_States | 1 data channel mode | 2 data channel mode |
|---|---|---|
| Command | SPI_USR_COMMAND_VALUE<br>SPI_USR_COMMAND_BITLEN<br>SPI_USR_COMMAND | SPI_USR_COMMAND_VALUE<br>SPI_USR_COMMAND_BITLEN<br>SPI_USR_COMMAND<br>SPI_FCMD_DUAL |
| Address | SPI_USR_ADDR_VALUE<br>SPI_USR_ADDR_BITLEN<br>SPI_USR_ADDR | SPI_USR_ADDR_VALUE<br>SPI_USR_ADDR_BITLEN<br>SPI_USR_ADDR<br>SPI_FADDR_DUAL |
| Waiting | SPI_USR_DUMMY_CYCLELEN<br>SPI_USR_DUMMY<br>SPI_USR_MOSI<br>SPI_USR_MOSI_DBITLEN | SPI_USR_DUMMY_CYCLELEN<br>SPI_USR_DUMMY |
| Output | SPI_USR_MOSI<br>SPI_USR_MOSI_DBITLEN | SPI_USR_MOSI<br>SPI_USR_MOSI_DBITLEN<br>SPI_FWRITE_DUAL |
| Input | SPI_USR_MOSI<br>SPI_USR_MOSI_DBITLEN | SPI_USR_MOSI<br>SPI_USR_MOSI_DBITLEN<br>SPI_FWRITE_DUAL |

TABLE 4

Command configuration table for 4 data channel/8 data channel mode

| SPI State | 4 data channel mode | 8 data channel mode |
|---|---|---|
| Command | SPI_USR_COMMAND_VALUE<br>SPI_USR_COMMAND_BITLEN<br>SPI_FCMD_QUAD<br>SPI_USR_COMMAND | SPI_USR_COMMAND_VALUE<br>SPI_USR_COMMAND_BITLEN<br>SPI_FCMD_OCT<br>SPI_USR_COMMAND |
| Address | SPI_USR_ADDR_VALUE<br>SPI_USR_ADDR_BITLEN<br>SPI_USR_ADDR<br>SPI_FADDR_QUAD | SPI_USR_ADDR_VALUE<br>SPI_USR_ADDR_BITLEN<br>SPI_USR_ADDR<br>SPI_FADDR_OCT |
| Waiting | SPI_USR_DUMMY_CYCLELEN<br>SPI_USR_DUMMY<br>SPI_USR_MOSI<br>SPI_USR_MOSI_DBITLEN | SPI_USR_DUMMY_CYCLELEN<br>SPI_USR_DUMMY |
| Output | SPI_USR_MOSI<br>SPI_USR_MOSI_DBITLEN<br>SPI_FWRITE_QUAD | SPI_USR_MOSI<br>SPI_USR_MOSI_DBITLEN<br>SPI_FWRITE_OCT |
| Input | SPI_USR_MISO<br>SPI_USR_MISO_DBITLEN<br>SPI_FREAD_QUAD | SPI_USR_MISO<br>SPI_USR_MISO_DBITLEN<br>SPI_FREAD_OCT |

As a non-limiting example, the operating configuration corresponding to the "Command", "Address", "Waiting", "Input" and "Output" states of the SPI controller according to the present disclosure can be controlled in the following manner.

1) The "Command" state of the SPI controller is controlled by the register values on the same line as the "Command" state in the above Table 3 and Table 4. By setting the SPI_USR_COMMAND bit to enable the "Command" state, the SPI controller will include the "Command" state, and will send the configured SPI command. By clearing the SPI_USR_COMMAND bit, the SPI controller will skip the "Command" state, and no SPI command will be sent. When the SPI_USR_COMMAND bit is set, the command value sent by the SPI controller is configured in SPI_USR_COMMAND VALUE, and the number of clock cycles that last is configured in SPI_USR_COMMAND_BITLEN. When the command value is sent in 8 data channel mode, the SPI_FCMD_OCT bit is set, and the SPI_FCMD_QUAD and SPI_FCMD_DUAL bits are cleared. when the command value is sent in 4 data channel mode, the SPI_FCMD_QUAD bit is set, and the SPI_FCMD_OCT and SPI_FCMD_DUAL bits are cleared. When the command value is sent in 2 data channel mode, the SPI_FCMD_DUAL bit is set, the SPI_FCMD_OCT and SPI_FCMD_QUAD bits are cleared. When the command value is sent in 1 data channel mode, the SPI_FCMD_OCT, SPI_FCMD_QUAD and SPI_FCMD_DUAL bits are cleared.

2) The "Address" state of the SPI controller is controlled by the register values on the same line as the "Address" state in Table 3 and Table 4. By setting the SPI_USR_ADDR bit to enable the "Address" state, the SPI controller will include the "Address" state, and will send the configured SPI address. By clearing the SPI_USR_ADDR bit, the SPI controller will skip the "Address" state, and the SPI address will not be sent. When the SPI_USR_ADDR bit is set, the address value sent by the SPI controller is configured in SPI_USR_COMMAND VALUE, and the number of clock cycles that last is configured in SPI_USR_COMMAND_BITLEN. When the address value is sent in 8 data channel mode, the SPI_FADDR_OCT bit is set, and the SPI_FADDR_QUAD and SPI_FADDR_DUAL bits are cleared. When the address value is sent in 4 data channel mode, the SPI_FADDR_QUAD bit, and the SPI_FADDR_OCT and SPI_FADDR_DUAL bits are cleared. When the address value is sent in 2 data channel mode, the SPI_FADDR_DUAL bit is set, and the SPI_FADDR_OCT and SPI_FADDR_QUAD bits are cleared. When the address value is sent in 1 data channel mode, the SPI_FADDR_OCT, SPI_FADDR_QUAD, and SPI_FADDR_DUAL bits are cleared.

3) The "Waiting" state of the SPI controller is controlled by the register value on the same line as "Waiting" in Table 3 and Table 4. By setting the SPI_USR_DUMMY bit to enable the "Waiting" state, the SPI controller will remain in the "Waiting" state for SPI_USR_DUMMY CYCLELEN SPI_CLK clock cycles; by clearing the SPI_USR_DUMMY bit, the SPI controller will skip the "Waiting" state.

4) The "Output" state of the SPI controller is controlled by the register value on the same line as "Output" in Table 3 and Table 4. By setting the SPI_USR_MOSI bit to enable the "Output" state, the SPI controller will include the "Output" state. By clearing the SPI_USR_MOSI bit, the SPI controller will skip the "Output" state and SPI output data will not be sent. When the SPI_USR_MOSI bit is set, the data in the SPI cache will be sent in the CPU control mode; and in the DMA control mode, the memory data configured by the DMA configuration linked list or the DMA TX linked list will be sent, and the number of clock cycles for transmitting data is configured in SPI_USR_MOSI_DBITLEN. When transmitting data in 8 data channel mode, the SPI_FWRITE_OCT bit is set, and the SPI_FWRITE_QUAD and SPI_FWRITE_DUAL bits are cleared. When transmitting data in 4 data channel mode, the SPI_FWRITE_QUAD bit is set, and the SPI_FWRITE_OCT and SPI_FWRITE_DUAL bits are cleared. When transmitting data in 2 data channel mode, the SPI_FWRITE_DUAL bit is set, and the SPI_FWRITE_OCT and SPI_FWRITE_QUAD bits are cleared. When transmitting data in 1 data channel mode, the SPI_FWRITE_OCT, SPI_FWRITE_QUAD and SPI_FWRITE_DUAL bits are cleared.

5) The "Input" state of the SPI controller is controlled by the register values on the same line as "Input" in Table 3 and Table 4. By setting the SPI_USR_MISO bit to enable the "Input" state, and the SPI controller will include the "Input" state; by clearing the SPI_USR_MISO bit, the SPI controller will skip the "Input" state and SPI input data will not be received. When the SPI_USR_MISO bit is set, the received data will be stored in the SPI cache in the CPU control mode, and in the DMA control mode, the received data will be stored in the memory configured by the DMA RX linked list, and the number of clock cycles for receiving data is configured in SPI_USR_MISO_DBITLEN. When receiving data in 8 data channel mode, the SPI_FREAD_OCT bit is set, and the SPI_FREAD_QUAD and SPI_FREAD_DUAL bits are cleared. When receiving data in 4 data channel mode, the SPI_FREAD_QUAD bit is set, and the SPI_FREAD_OCT and SPI_FREAD_DUAL bits are cleared. When receiving data in 2 data channel mode, the SPI_FREAD_DUAL bit is set, and the SPI_FREAD_OCT and SPI_FREAD_QUAD bits are cleared. When receiving data in 1 data channel mode, the SPI_FREAD_OCT, SPI_FREAD_QUAD and SPI_FREAD_DUAL bits are cleared.

Figure 4:
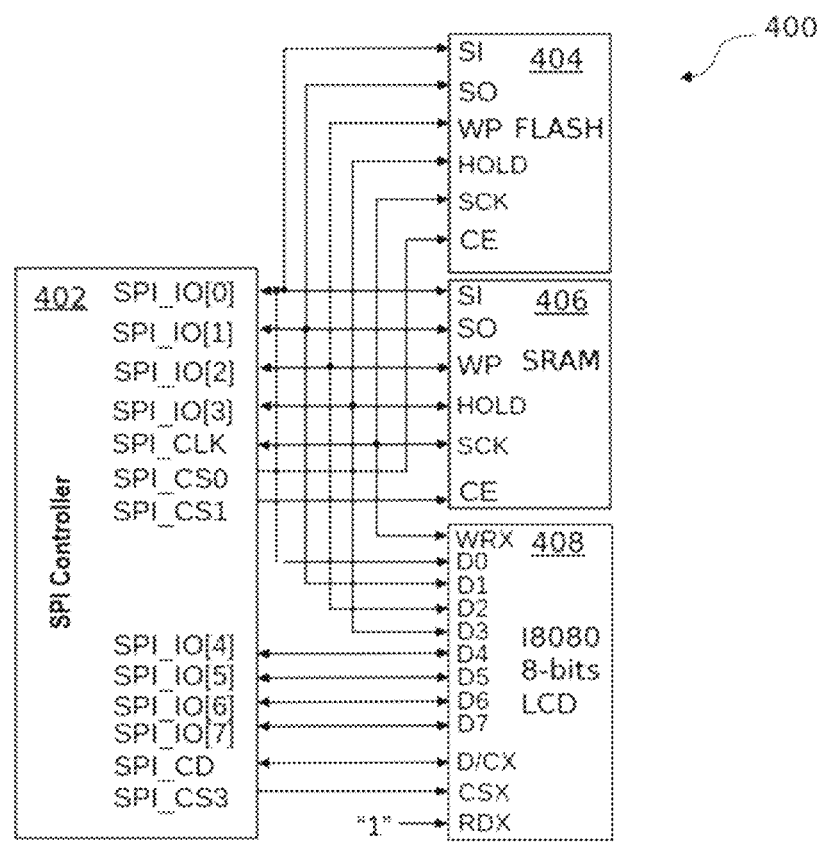
FIG. 4 schematically illustrates a structural diagram of an SPI controller accessing flash memory (Flash), SRAM, and LCD in a time-sharing manner according to the present disclosure.

As described above, the SPI controller according to the present disclosure can implement SPI transmission in any feasible 1/2/4/8 data channel modes. As shown in FIG. 4, the SPI controller 402 according to the present disclosure can access the flash memory 404, the SRAM 406 and the 8-bit LCD in Intel 8080 mode in a time-sharing manner as shown in FIG. 4. Other 1/2/4/8 channel SPI peripherals can be accessed at the same time.

In the embodiment of the present disclosure, a new data flow control mechanism for SPI communication: DMA-controlled segmented configuration transmission is also implemented. The SPI controller according to the present disclosure supports multiple segmented configuration transmissions controlled by DMA, and the SPI controller can reconfigure the SPI registers via the DMA controller in the "Configuration" state before each SPI transmission. Thus, as a non-limiting example, the following functions can be realized.

1) Each segment of SPI transmission can be configured as full-duplex communication or half-duplex communication, SDR data sampling mode or DDR data sampling mode.

2) Each segment of half-duplex communication can be independently configured with the 1/2/4/8 data channel mode and the data delay of each channel of the SPI interface in the "Command", "Address", "Output" and "Input" states.

3) The SPI controller according to the present disclosure includes a plurality of CS chip select signals, and can independently control the working conditions of each CS in multiple segmented configuration transmissions controlled by DMA, so as to support the function of accessing different SPI peripherals in different SPI transmission modes in a time-sharing manner.

4) The data length of each SPI transmission is determined by the configured DMA controller, and all can be independently configured to any value.

Figure 5:
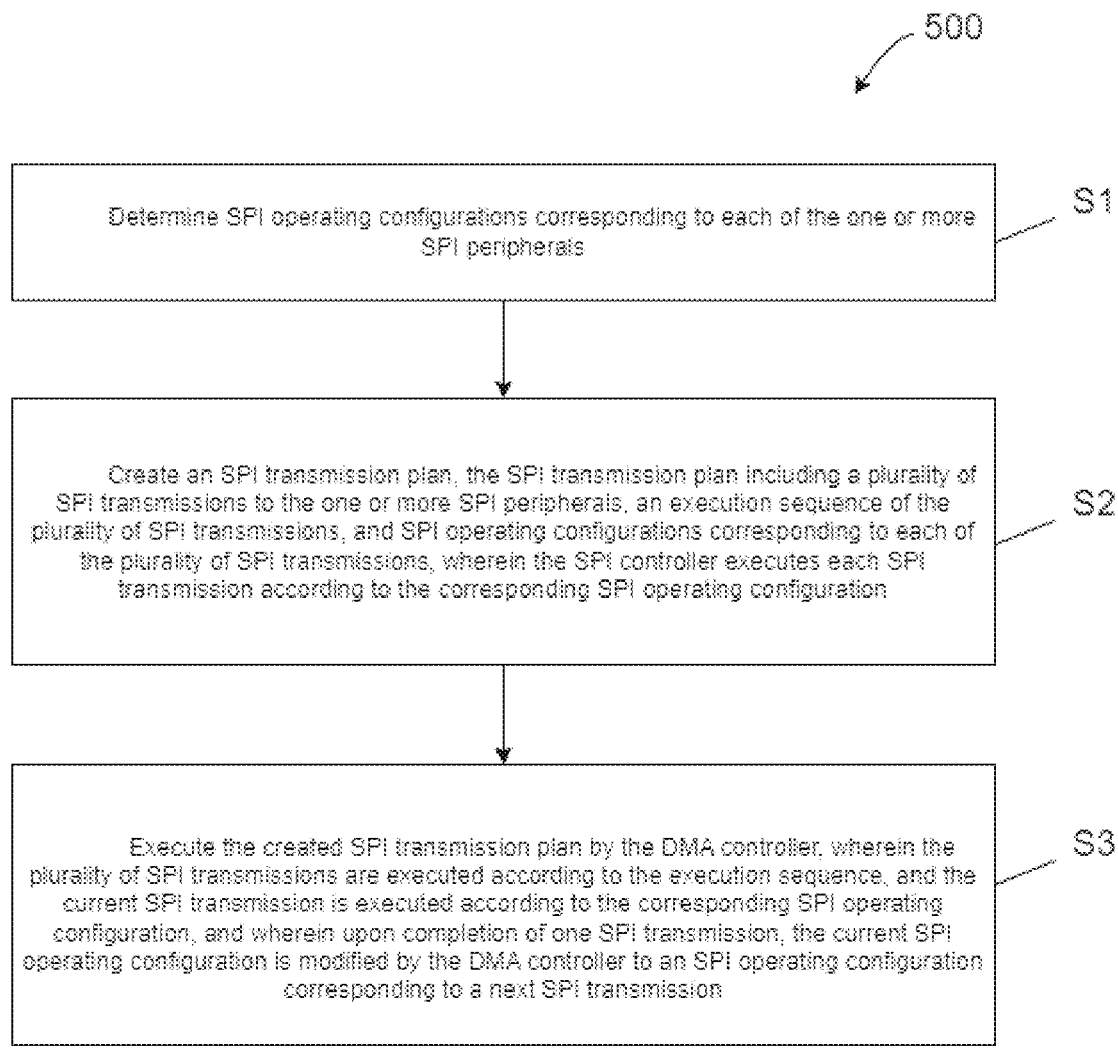
FIG. 5 schematically illustrates a schematic flowchart of a method of operating an SPI controller according to an embodiment of the present disclosure.

FIG. 5 schematically shows a schematic flowchart of a method 500 of operating an SPI controller according to an embodiment of the present disclosure. In this embodiment, the SPI controller is electrically coupled to a CPU and a DMA controller via a bus, and is electrically coupled to one or more SPI peripherals via a plurality of SPI pins, wherein the SPI controller includes a register group and is configured to be capable of operating in a CPU control mode or a DMA control mode. As shown in FIG. 5, the method 500 includes: S1) determining one or more SPI operating configurations corresponding to each of the one or more SPI peripherals; S2) creating an SPI transmission plan, the SPI transmission plan including a plurality of SPI transmissions to the one or more SPI peripherals, an execution sequence of the plurality of SPI transmissions, and SPI operating configurations corresponding to each SPI transmission in the plurality of SPI transmissions, wherein the SPI controller executes each SPI transmission according to the corresponding SPI operating configuration; and S3) executing the created SPI transmission plan under the control of the DMA controller, wherein the plurality of SPI transmissions are executed according to the execution sequence, and the current SPI transmission is executed according to the corresponding SPI operating configuration, and wherein upon completion of an SPI transmission, the DMA controller modifies the current SPI operating configuration to the SPI operating configuration corresponding to the next SPI transmission.

It should be understood that, in the method of operating an SPI controller according to the present disclosure, one SPI peripheral may correspond to multiple SPI operating configurations, and multiple SPI transmissions in the SPI transmission plan may include SPI transmissions for multiple SPI peripherals, and may also include SPI transmissions applying a plurality of different SPI operating configurations for one SPI peripheral.

Figure 6:
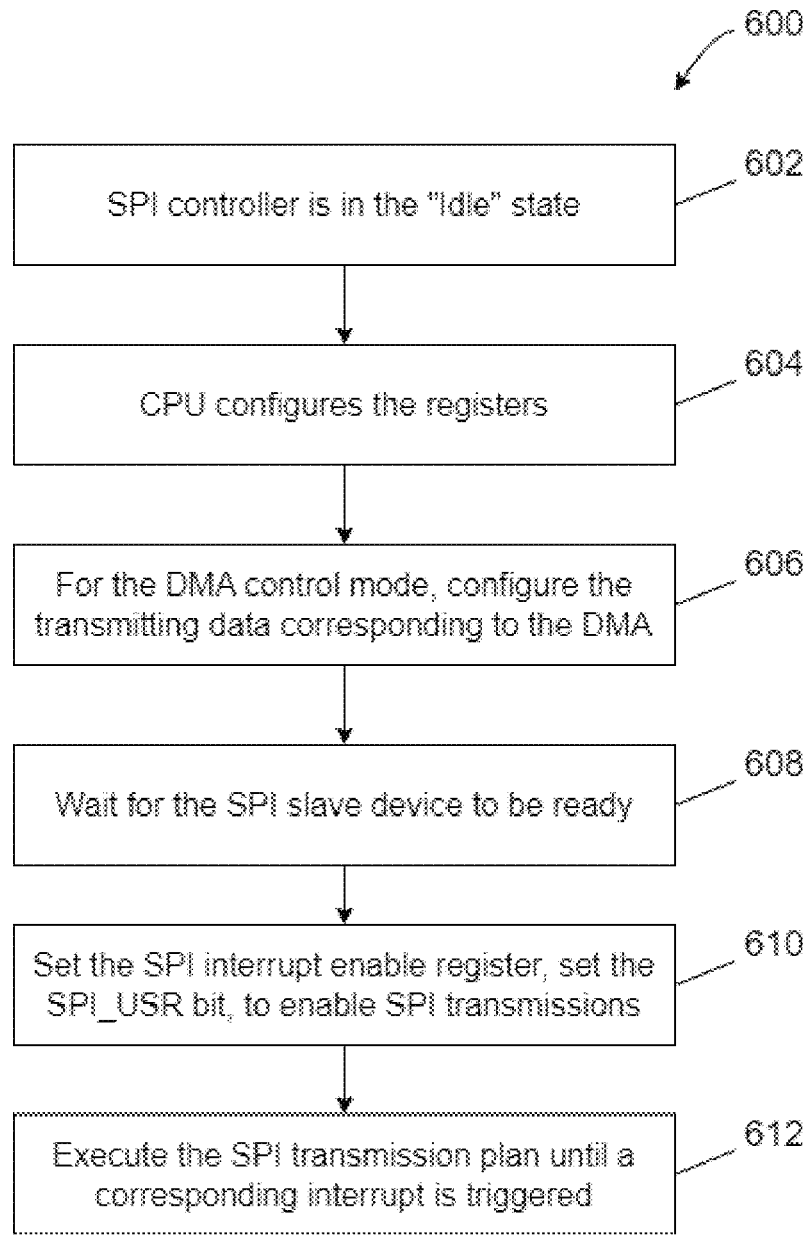
FIG. 6 schematically illustrates an SPI transmission flowchart according to an embodiment of the present disclosure.

FIG. 6 schematically illustrates an SPI transmission flowchart 600 according to an embodiment of the present disclosure. At step 602, the SPI controller is in the "Idle" state. At step 604, the CPU configures the registers in the register group of the SPI controller. At step 606, for the DMA control mode, the CPU configures the transceiving data corresponding to the DMA. At step 608, the SPI controller waits for the SPI slave device to be ready for data transmission. At step 610, the CPU sets the SPI interrupt enable register and enables SPI transmissions. At step 612, the SPI transmission plan is executed until a corresponding interrupt is triggered.

Figure 7:
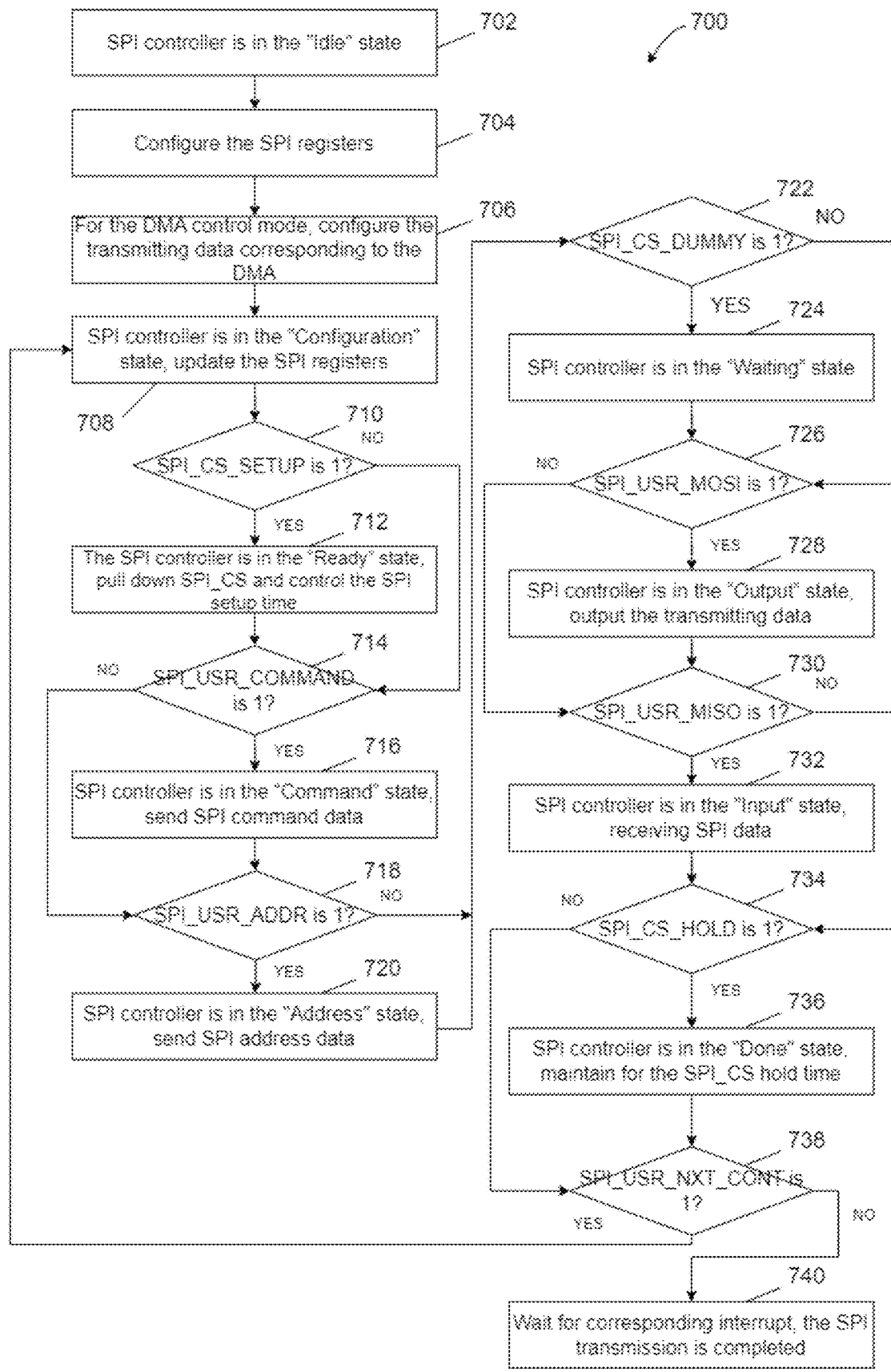
FIG. 7 schematically illustrates a flowchart of SPI segmented configuration transmission according to an embodiment of the present disclosure.

FIG. 7 schematically illustrates a flowchart 700 of SPI segmented configuration transmission according to an embodiment of the present disclosure. At step 702, the SPI controller is in the "Idle" state. At step 704, the CPU configures the registers in the register group of the SPI controller. At step 706, for the DMA control mode, the transceiving data corresponding to the DMA is configured, or for the CPU mode, the transceiving data in the SPI cache is configured. At step 708, the SPI controller is in the "Configuration" state, and the SPI registers are updated. At step 710, it is judged whether the register value SPI_CS_SETUP is 1 or not. If yes, it is confirmed that the SPI controller is in the "Preparation" state, and at step 712, the chip select signal is pulled down and the SPI setup time is controlled. Otherwise, jump to step 714. At step 714, it is judged whether the register value SPI_USR_COMMAND is 1 or not. If yes, it is confirmed at step 716 that the SPI controller is in the "Command" state, and send SPI command data, otherwise, jump to step 718. At step 718, it is judged whether the register value SPI_USR_ADDR is 1 or not, if yes, it is confirmed at step 720 that the SPI controller is in the "Address" state, and send SPI address data, otherwise, jump to step 722. At step 722, it is judged whether the register value SPI_CS_DUMMY is 1 or not, if yes, it is confirmed at step 724 that the SPI controller is in the "Waiting" state, and no operation is performed, otherwise, jump to step 726. At step 726, it is judged whether the register value SPI_USR_MOSI is 1 or not, if yes, it is confirmed at step 728 that the SPI controller is in the "Output" state, and output the transmitting data, otherwise, jump to step 730. At step 730, it is judged whether the register value SPI_USR_MISO is 1, if yes, it is confirmed at step 732 that the SPI controller is in the "Input" state, and receive SPI data, otherwise, jump to step 734. At step 734, it is judged whether SPI_CS_HOLD is 1 or not, if yes, it is confirmed at step 736 that the SPI controller is in the "Done" state, and keep for the set chip select hold time. Next, it is judged at step 738 whether SPI_USR_NXT_CONT is 1 or not, if yes, it is confirmed that there is a next SPI transmission in the SPI transmission plan, and return to step 708 to execute the next SPI transmission. If not, proceed to step 740, the execution of the SPI transmission plan is completed.

Figure 8:
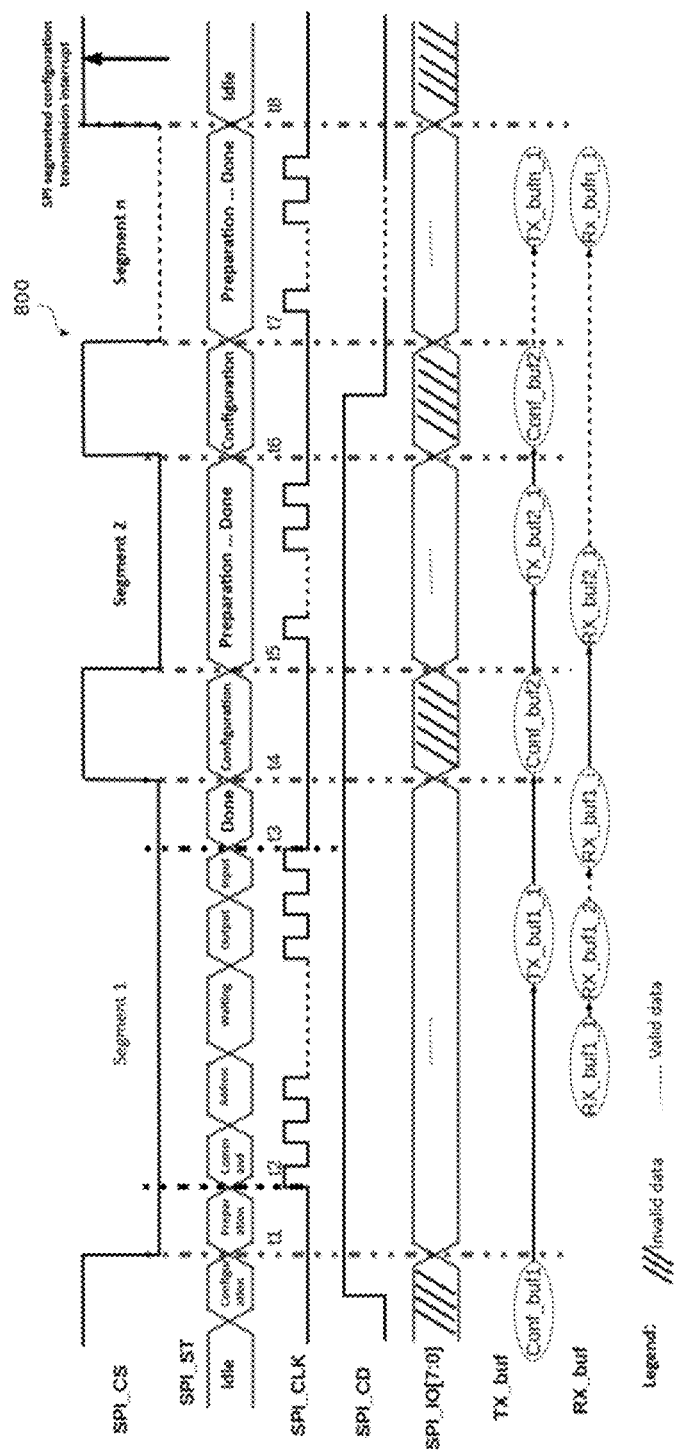
FIG. 8 schematically illustrates a timing diagram of a DMA-controlled segmented configuration transmission according to the present disclosure.

FIG. 8 schematically shows a timing diagram 800 of a DMA-controlled segmented configuration transmission according to the present disclosure. As shown in the figure, the horizontal axis of the SPI timing diagram 800 is time, and the multi-line charts arranged from top to bottom in the vertical direction show various signals and states of the SPI controller. The SPI_CS line shows the state of the chip select signal. In diagram 800, when SPI_CS is pulled low, it indicates that there are SPI peripherals being selected, for example, the same or different SPI peripherals are selected at segment 1, segment 2, and segment n, where n is any positive value greater than 2. The SPI ST line indicates the state of the SPI state machine. In diagram 800, before the start of segment 1, i.e., before time t1, the SPI state machine is in the "Configuration" state, and the SPI transmission plan is configured by the CPU. Between time t1 and t2, the SPI state machine is in the "Preparation" state, controlling the SPI chip select setup time. When the CPU enables SPI transmission at time t2, the transmission of segment 1 begins. In the illustrated embodiment, segment 1 includes the "Preparation", "Command", "Address", "Waiting", "Input", "Output" and "Done" states, but it should be understood by those skilled in the art that the implementation of present disclosure is not limited to this. Each SPI transmission of the present disclosure may include more or fewer states than those described, or may include a different number, order and content of states as shown.

In the SPI schemes of the existing art, at the end of a segment of SPI transmission, an interrupt will be triggered, and the control will be returned to the CPU, and the SPI state machine will enter into the "Idle" state. In contrast, in the SPI controller scheme according to the present disclosure, the SPI state machine does not enter into the "Idle" state and control is not returned to the CPU between two consecutive SPI transmissions, e.g., between the SPI transmissions of segment 1 and segment 2. In contrast, in DMA control mode, after the "Done" state of segment 1, the SPI state machine enters into the "Configuration" state without CPU intervention or any action. For example, the input/output controller in the SPI controller according to the present disclosure can be configured to receive an updated SPI operating configuration from the DMA controller and update the updated SPI operating configuration into the register group between two consecutive SPI transmissions. The update of the register group can be performed, for example, in the "Configuration" state between segment 1 and segment 2.

In FIG. 8, SPI_CLK indicates the SPI clock signal, which controls the beat of each state and the synchronization between various operations of the SPI controller; SPI_CD indicates the SPI command/data signal; SPI_IO[7:0] schematically indicates the state of the SPI input/output pins [7:0], where the transmission of valid data corresponds to the input/output states, and in the "Configuration" state, the SPI input/output pins do not carry valid data. In FIG. 8, the line Conf_buf/Tx_buf indicates the DMA configuration linked list or DMA transmitting linked list (also known as the DMA TX linked list), where the configuration node Conf_buf corresponds to the DMA configuration buffer, which is used to configure the register group of the SPI controller. The transmitting node TX_buf corresponds to the DMA transmitting buffer, which is used for data transmission in DMA control mode and for configuration of state switching. The line RX_buf indicates the DMA receiving linked list, and the receiving node RX_buf corresponds to the DMA input buffer for data reception in DMA control mode.

Before each segmented configuration transmission, the register group of the SPI controller can be configured through the configuration buffer (Conf_buf). In an embodiment of the present disclosure, a DMA configuration linked list including one or more configuration nodes is provided, wherein each configuration node corresponds to one SPI transmission, and contains an SPI operating configuration corresponding to the one SPI transmission and is linked to the transmitting data linked list of the one SPI transmission, the transmitting data linked list being linked to a next configuration node, and the information of the SPI operating configuration being stored in an area in DMA configuration buffer; and after the completion of an SPI transmission, the current SPI operating configuration is modified by the DMA controller to an SPI operating configuration corresponding to the next SPI transmission, including: reading the SPI operating configuration corresponding to a next SPI transmission from an area corresponding to a configuration node of the next SPI transmission in the DMA configuration buffer, and writing the SPI operating configuration into the register group.

If the one SPI transmission includes an "Output" state, then the configuration node is linked to the transmitting data linked list of the one SPI transmission, and the transmitting data linked list is linked to the next configuration node. Otherwise, the configuration node is directly linked to the next configuration node. As shown in FIG. 8, multiple (n) configuration nodes Conf_buf1, Conf_buf2, . . . , Conf_bufn corresponding to the "Configuration" state are linked with the transmitting nodes TX_buf1_1, TX_buf2_1 corresponding to the "Output" state to form a DMA configuration linked list. One or more transmitting nodes linked together form a transmitting data linked list. Although as shown in FIG. 8, the DMA configuration linked list includes multiple configuration nodes linked together and multiple transmitting nodes linked together. However, it should be understood that in the embodiment of an SPI controller on an SPI slave, the DMA configuration linked list may also include one or more configuration nodes and one or more receiving nodes RX_buf1_1, RX_buf1_2, etc., that are linked together. More generally, the DMA configuration linked list, the DMA transmitting linked list, and the DMA receiving linked list may be implemented in the same or different linked lists without departing from the scope of the present disclosure.

It should be understood that, in the above embodiments, the SPI transmission plan is implemented as a DMA configuration linked list, but the DMA configuration linked list is only one way of implementing the SPI transmission plan. It should be understood by those skilled in the art that the SPI transmission plan described herein may be implemented using a different data structure other than a linked list, and/or may be stored in different storage devices.

In the solution of the present disclosure, the register group in the SPI controller needs to be updated between multiple consecutive SPI transmissions. In one embodiment of the present disclosure, the above-mentioned information of the SPI operating configuration includes the value of one or more registers corresponding to the SPI operating configuration, so that the value of the one or more registers will be updated as a whole when the SPI operating configuration is changed.

In a preferred embodiment of the present disclosure, the above information of the SPI operating configuration includes the difference between the values of the one or more registers corresponding to the SPI operating configuration of the current configuration node and the values of the one or more registers corresponding to the SPI operating configuration of the previous configuration node in the DMA configuration linked list. Further, each of the one or more bits of specified locations in an area in the DMA configuration buffer corresponds to one of the one or more registers corresponding to the SPI operating configuration of the current configuration node, indicating whether the value of the register has changed compared to the SPI operating configuration of the previous configuration node. The method preferably further includes: when writing the SPI operating configuration into the register group, updating only the value of the registers that have changed compared to the SPI operating configuration of the previous configuration node. In other words, the present disclosure further provides a scheme for updating the contents of the registers in the register group of the SPI controller.

For example, Table 5 below shows a mapping table of bit-by-bit configuration of registers for the SPI segmented configuration transmission mode according to an embodiment of the present disclosure.

TABLE 5

SPI register bit-by-bit configuration mapping table

| Configuration Mapping Bit | Register Name |
|---|---|
| 0 | SPI_CMD |
| 1 | SPI_ADDR |
| 2 | SPI_CTRL |
| 3 | SPI_CTRL1 |
| 4 | SPI_CTRL2 |
| 5 | SPI_CLOCK |
| 6 | SPI_USER |
| 7 | SPI_USER1 |
| 8 | SPI_USER2 |
| 9 | SPI_MOSI_DLEN |
| 10 | SPI_MISO_DLEN |
| 11 | SPI_MISC |
| 12 | SPI_SLAVE |
| 13 | SPI_FSM |
| 14 | SPI_HOLD |
| 15 | SPI_DMA_INT_ENA |
| 16 | SPI_DMA_INT_RAW |
| 17 | SPI_DMA_INT_CLR |
| 18 | SPI_OF_MODE |
| 19 | SPI_DIN_NUM |
| 20 | SPI_DOUT_MODE |
| 21 | SPI_DOUT_NUM |
| 22 | SPI_LCD_CTRL |
| 23 | SPI_LCD_CTRL1 |
| 24 | SPI_LCD_CTRL2 |
| 25 | SPI_LCD_D_MODE |
| 26 | SPI_LCD_D_NUM |
| — | — |

In order to reduce the hardware overhead, in one embodiment of the present disclosure, the first few words (WORD) stored in each configuration buffer are used to determine whether it is necessary to reset the relevant registers of the SPI controller, and these words are referred to as the bitmap values SPI_BIT_MAP_REG. In one embodiment of the present disclosure, the bitmap values are stored in a configuration buffer. In another embodiment of the present disclosure, the bitmap values are stored in registers. The registers that store bitmap values may be referred to as "bitmap registers." It should be understood that, in the embodiments of the present disclosure, the bitmap registers may be implemented to exclusively store the bitmap values, or may be implemented to store values other than the bitmap values. In one embodiment of the present disclosure, the low 27 bits in the first word of the configuration buffer are used as the bitmap value to determine whether it is necessary to reset the 27 registers of the SPI controller, although it is possible to accommodate the scenario of resetting more registers by adding a second word, a third word, . . . , of the configuration buffer to be used as bitmap values. It should be understood that in this embodiment, a "word" may be 32 bits, but the implementation of the present disclosure is not limited thereto. It is also possible to use words of 32 bits or more or less to implement the disclosure.

In one embodiment of the present disclosure, it can be defined that: if the value of the bit used for determining in the bitmap value is 1, the corresponding register needs to be reset; if the value of the bit used for determining is 0, then the corresponding register will not be reset. Therefore, in the segmented configuration transmission mode controlled by DMA, all registers can be configured first, and then in the configuration buffer of any segmented configuration transmission, registers different from the previous segmented configuration transmission can be configured to reset the SPI registers that need to be modified, thus greatly reducing the time of hardware configuration and the complexity of software configuration. If the operation mode of a segmented configuration transmission is the same as the previous one, the bitmap values SPI_BIT_MAP_REG in the configuration buffer of the segmented configuration are all 0, and the registers of the SPI controller do not need to be reset.

Table 6 below provides an example of bit-by-bit configuration mapping of SPI registers according to the present disclosure. For example, if the lower 27 bits of the first word of the configuration buffer for a segmented configuration are shown in Table 6, the registers that need to be reset for this segmented configuration transmission are SPI_ADDR, SPI_CTRL, SPI_CLOCK, SPI_USER and SPI_USER1.

TABLE 6

SPI registers bit-by-bit configuration mapping table

| Configuration Mapping Bit | The Value of the Configuration Mapping Bit | Register Name |
| --- | --- | --- |
| 0 | 0 | SPI_CMD |
| 1 | 1 | SPI_ADDR |
| 2 | 1 | SPI_CTRL |
| 3 | 0 | SPI_CTRL1 |
| 4 | 0 | SPI_CTRL2 |
| 5 | 1 | SPI_CLOCK |
| 6 | 1 | SPI_USER |
| 7 | 1 | SPI_USER1 |
| 8 | 0 | SPI_USER2 |
| 9 | 0 | SPI_MOSI_DLEN |
| 10 | 0 | SPI_MISO_DLEN |
| 11 | 0 | SPI_MISC |
| 12 | 0 | SPI_SLAVE |
| 13 | 0 | SPI_FSM |
| 14 | 0 | SPI_HOLD |
| 15 | 0 | SPI_DMA_INT_ENA |
| 16 | 0 | SPI_DMA_INT_RAW |
| 17 | 0 | SPI_DMA_INT_CLR |
| 18 | 0 | SPI_OF_MODE |
| 19 | 0 | SPI_DIN_NUM |
| 20 | 0 | SPI_DOUT_MODE |
| 21 | 0 | SPI_DOUT_NUM |
| 22 | 0 | SPI_LCD_CTRL |
| 23 | 0 | SPI_LCD_CTRL1 |
| 24 | 0 | SPI_LCD_CTRL2 |
| 25 | 0 | SPI_LCD_D_MODE |
| 26 | 0 | SPI_LCD_D_NUM |
| — | — | — |

In addition, in order to improve the reliability of segmented configuration transmission, in one embodiment of the present disclosure, a plurality of bits in specified locations in an area in the DMA configuration buffer are set as an error checking number, and an error check calibration reference number is provided inside the SPI controller. Only when the error checking number and the error check calibration reference number match a pre-specified relationship, the SPI operating configuration corresponding to the next SPI transmission is read from an area of the DMA configuration buffer of the configuration node corresponding to the next SPI transmission, and the SPI operating configuration is written into the register group.

In a non-limiting embodiment of the present disclosure, an error checking number is added to the first word of each configuration buffer, hereinafter referred to as the first magic number, for example, the upper 5 bits of the first word of the configuration buffer is used as the first magic number in the present disclosure. Of course, the first magic number can be anywhere in the configuration buffer. There is a correct error check calibration reference number inside the SPI controller that cannot be modified in the configuration buffer, hereinafter referred to as the second magic number, and it can be stipulated that the first magic number in the configuration buffer and the second magic number inside the SPI controller must be satisfy the specified relationship in order to configure the registers of the SPI controller successfully, and the segmented configuration transmission controlled by DMA continues. Otherwise, the configuration fails, and the segmented configuration transmission controlled by DMA ends, and an interrupt and error flag is given at the same time.

The specified relationship that two magic numbers satisfy may be that both must be equal, or that the CRC check values of the two must be equal, or that the per-bit XOR values of the two are 0, or that the per-bit exclusive OR values are 0, and so on. It should be understood that the specified relationship between the two magic numbers can be determined according to implementation needs without departing from the scope of the present disclosure.

For example, in the embodiment 400 shown in FIG. 4, the SPI controller can access the flash memory, SRAM, and LCD in a time-sharing manner in different segmented configuration transmissions through the DMA-controlled segmented configuration transmission mode. It is only necessary to configure the relevant registers that need to be modified when accessing the flash memory 404, SRAM 406, and LCD 408 in the configuration buffer before accessing the flash memory 404, SRAM 406, and LCD 408 respectively, and at the same time ensure that the first magic numbers in all Conf_bufs are correct.

As a non-limiting example, in the SPI controller and the method of operating an SPI controller according to the present disclosure, the technical means adopted for the segmented configuration transmission controlled by DMA may include:

1) Establishing a mapping relationship between the bitmap values SPI_BIT_MAP_REG in the DMA configuration buffer and the SPI registers, and determining whether to update the corresponding registers according to the bit values of SPI_BIT_MAP_REG;

2) Using magic numbers to ensure correctness and security of communication; and

3) Implementing segmented SPI transmissions by means of DMA, and the type of each SPI transmission can be controlled independently. The segmented configuration transmission controlled by DMA according to the present disclosure can be used as a handshake mechanism, which can only read and write a large amount of data, and can also access multiple different peripherals in a time-sharing manner.

In contrast, when the SPI controller and its operating method in the existing art perform consecutive SPI transmissions, the CPU needs to obtain control between two SPI transmissions, and must wait until the SPI state machine returns to the idle state before the CPU can update the register group. As a result, it may be too late to update the registers in time, and the seamless switching of the operating configuration between any two segmented configuration transmissions cannot be realized. The segmented configuration transmission mode of the present disclosure updates the SPI register group in the configuration state, and can directly enter into the configuration state from the Done state, thereby greatly reducing configuration time and improving data throughput. In other words, according to the present disclosure, the SPI controller is always in the working mode (non-idle state) during multiple SPI transmissions, and can flexibly configure the operating configuration of each SP transmission.

Figure 9:
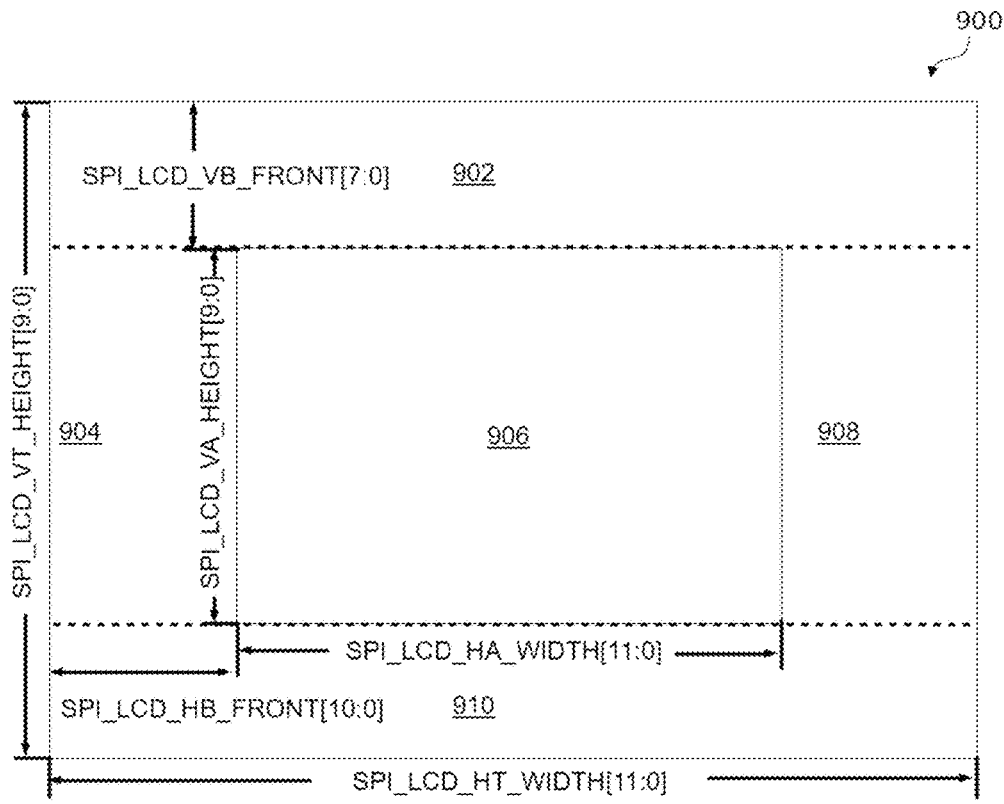
FIG. 9 schematically illustrates a frame format used by an SPI controller to access a parallel 8-bit RGB format LCD according to the present disclosure.

FIG. 9 schematically illustrates a frame format used by an SPI controller to access a parallel 8-bit RGB format LCD according to the present disclosure. In FIG. 9, a frame of LCD output data 900 includes a valid data area 906, an upper blank area 902, a lower blank area 910, a front blank area 904 and a rear blank area 908. In one embodiment of the present disclosure, the size of each area is as shown in FIG. 9. In general, a frame of LCD output data 900 has a width of SPI_LCD_HT_WIDTH[11:0], and a height of SPI_LCD_VT_HEIGHT[9:0]; the upper blank area 902 has the same width as the LCD frame 900, and a height of SPI_LCD_VB_FRONT[7:0]; the valid data area 906 has a width of SPI_LCD_HA_WIDTH[11:0], and a height of SPI_LCD_VA_HEIGHT[9:0]; the left blank area 904 has a width of SPI_LCD_HB_FRONT[10:0], and a height the same as the height of the valid data area. Based on the above, the sizes of the right blank area 908 and the lower blank area can be determined simply by subtraction. In this embodiment, a symbol such as [11:0] indicates the lower 12 bits in a word.

Figure 10:
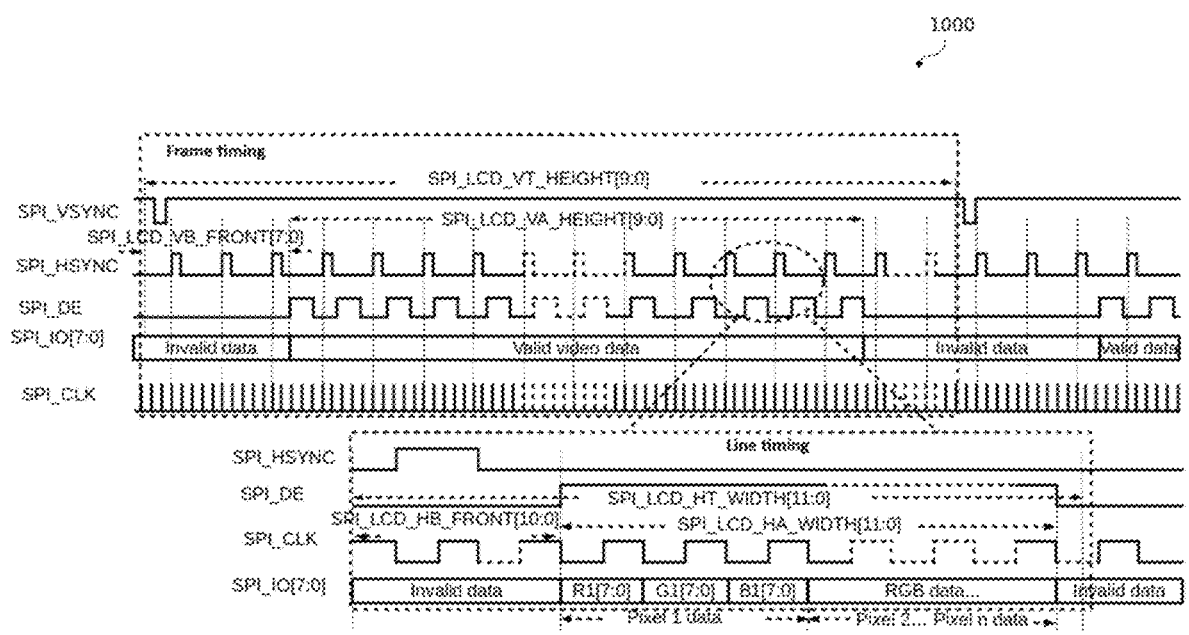
FIG. 10 schematically illustrates a timing diagram of an SPI controller accessing a parallel 8-bit RGB format LCD according to the present disclosure.

FIG. 10 schematically illustrates a timing diagram 1000 for an SPI controller accessing a parallel 8-bit RGB format LCD according to the present disclosure.

The horizontal axis of the timing diagram 1000 indicates time, while the multi-line diagrams arranged in the vertical direction indicate the time relationship between the SPI parameters. In FIG. 10, SPI_VSYNC indicates the frame frequency signal on the SPI frame frequency signal pin, and SPI_HSYNC indicates the line frequency signal on the SPI line frequency signal pin. For example, the rising edge of SPI_VSCNC indicates the start of transmission of a new frame of image; the rising edge of SPI_HSYNC indicates the start of transmission of a line of image data in the image. SPI_DE indicates the display valid signal on the SPI display valid signal pin, and takes the value of 0 or 1, to indicate whether there is a valid signal currently present on the SPI input/output pin. SPI_IO[7:0] indicates the data signals on the 8 SPI input/output pins. SPI_CLK indicates the SPI clock signal. Among them, the SPI command/data signal SPI_CD is used to represent the Command/DATA signal, which can be applied to Motorola 6800, Intel 8080 LCD interface.

As shown in FIG. 10, a period of the frame frequency signal or frame timing SPI_VSYNC indicates a duration of a frame, and a period of the line frequency signal or line timing SPI_HSYNC indicates a duration of a line. The SPI controller first detects a start of a frame through frame timing, and then detects a length of a line through line timing. According to a non-limiting embodiment of the present disclosure, the SPI state machine is configured to enable the "Configuration" state in the front blank area, enable the "Output" state in the valid data area, and enable any state except "Output" and "Idle" states in the upper blank area, the lower blank area, and the rear blank area, load the SPI operating configuration in "Configuration" state, and output one line of LCD output data at a time in the "Output" state.

The SPI controller according to the present disclosure not only can access multiple (such as 1/2/4/8) data channel SPI peripherals, but also support access to the LCD interface peripherals of Motorola 6800/Intel 8080/parallel 8-bit RGB format, thereby further extending the versatility of the SPI controller.

FIG. 10 illustrates the timing diagram of the SPI controller accessing the parallel 8-bit RGB format LCD via the segmented configuration transmission mode controlled by DMA. In this transmission mode, the "Idle", "Configuration", "Output" and "Done" states are selected. In the "Configuration" state, the DMA configuration buffer Conf_buf is loaded, and the registers of the SPI controller are not modified in the "Configuration" state. In the "Output" state, the LCD RGB data is output one line at a time. As a non-limiting embodiment, the configuration buffer and the transmitting buffer (TX_buf) can be configured in the DMA configuration linked list or the DMA TX linked list in advance. In the configuration buffer, all values except for the correct first magic number are 0, and TX_buf stores exactly one line of the LCD RGB data. This can be achieved by using a ping-pong buffer or a ring buffer to output new LCD RGB data all the time. Through the DMA-controlled segmented configuration transmission mode of the present disclosure, the SPI controller can continuously transmit entire frames or multiple frames of LCD RGB data without intervention or operation of the CPU.

It should be understood that the configuration buffer, the transmitting buffer and the input buffer described herein can be areas in the system memory or areas in the memory set up in the SPI controller, such as areas in the RAM, or alternatively areas in DRAM, SDRAM, SDRAM or PSRAM. Preferably, the configuration buffer, the transmitting buffer and the input buffer are areas in the system memory.

Compared with existing SPI controllers, the SPI controller of the present disclosure adds SPI_CD, SPI_VSYNC, SPI_HSYNC and SPI_DE signal lines, adds the "Configuration" state, adds the LCD mode, and adds control logic for SPI_CD, SPI_VSYNC, SPI_HSYNC, and SPI_DE signal lines in each state.

It should be understood that although FIG. 8 to FIG. 10 illustrate embodiments of an SPI controller on the SPI master interacting with an SPI slave, the principles of the present disclosure can also be applied to an SPI controller on an SPI slave.

Figure 11:
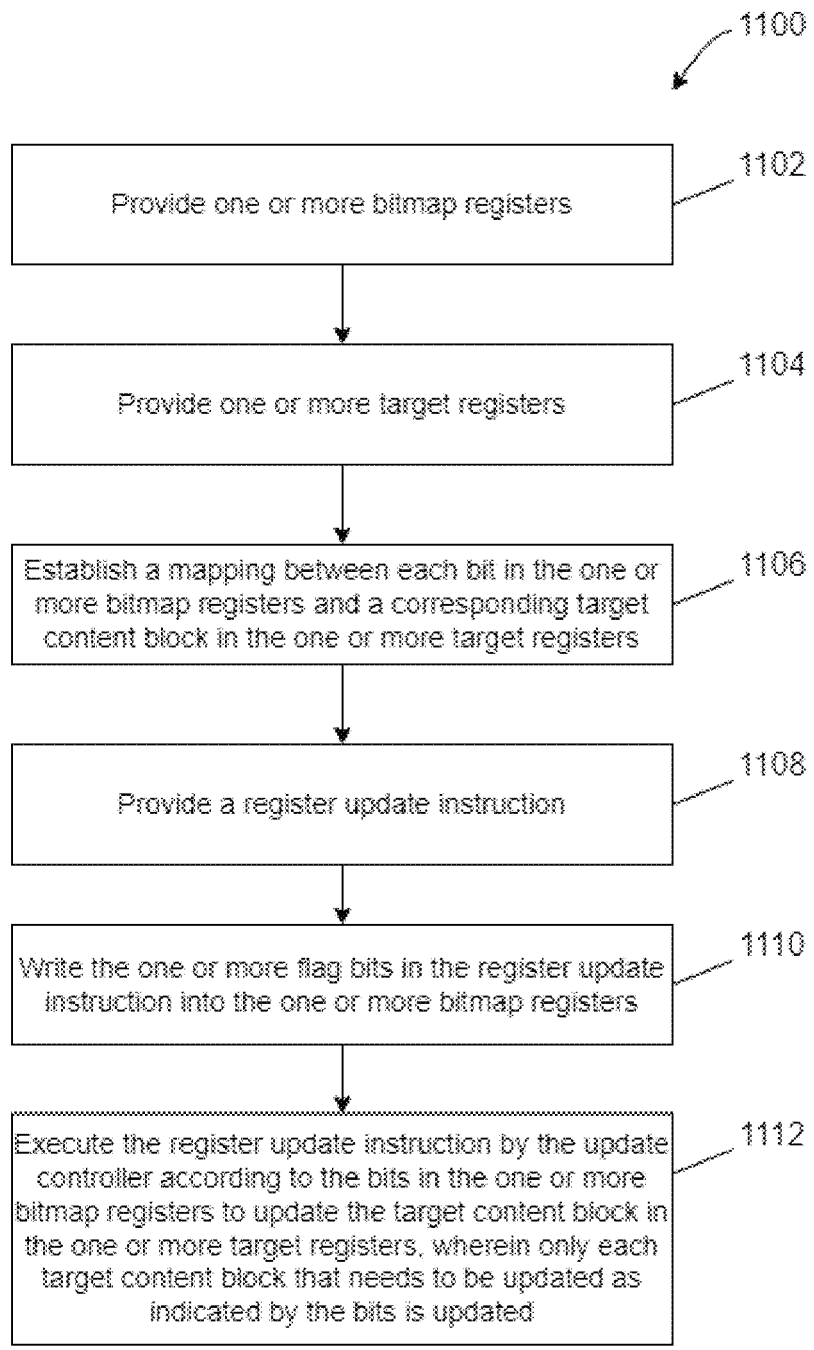
FIG. 11 schematically illustrates a flowchart for an embodiment of a method of updating registers according to the disclosure.

FIG. 11 schematically illustrates a flowchart for an embodiment of a method of updating registers according to the present disclosure. As shown in FIG. 11, the method 1100 of updating registers begins at step 1102, where one or more bitmap registers are provided. At step 1104, one or more target registers are provided. At step 1106, a mapping is established between each bit in the one or more bitmap registers and a corresponding target content block in the one or more target registers. At step 1108, a register update instruction is provided. In particular, the register update instruction may include: one or more flag bits at specified locations, wherein each flag bit corresponds to a bit in the one or more bitmap registers, indicating whether the target content block corresponding to the bit needs to be updated. Further, for each target content block indicated by the bit that needs to be updated, the register update instruction further includes a new content of the target content block or a source of the new content. At step 1110, the one or more flag bits in the register update instruction are written into the one or more bitmap registers. At step 1112, the register update instruction is executed by the update controller according to the bits in the one or more bitmap registers, so as to update the target content block in the one or more target registers, wherein only each target content block that needs to be updated as indicated by the bits is updated. In one embodiment of the present disclosure, the update controller is implemented by a logic circuitry other than the CPU, such as but not limited to, an input/output controller in an SPI controller, or other control logic in an embedded device module. Therefore, according to the embodiments of the present disclosure, the update of the target registers does not require CPU intervention, and does not occupy CPU resources.

Figure 12:
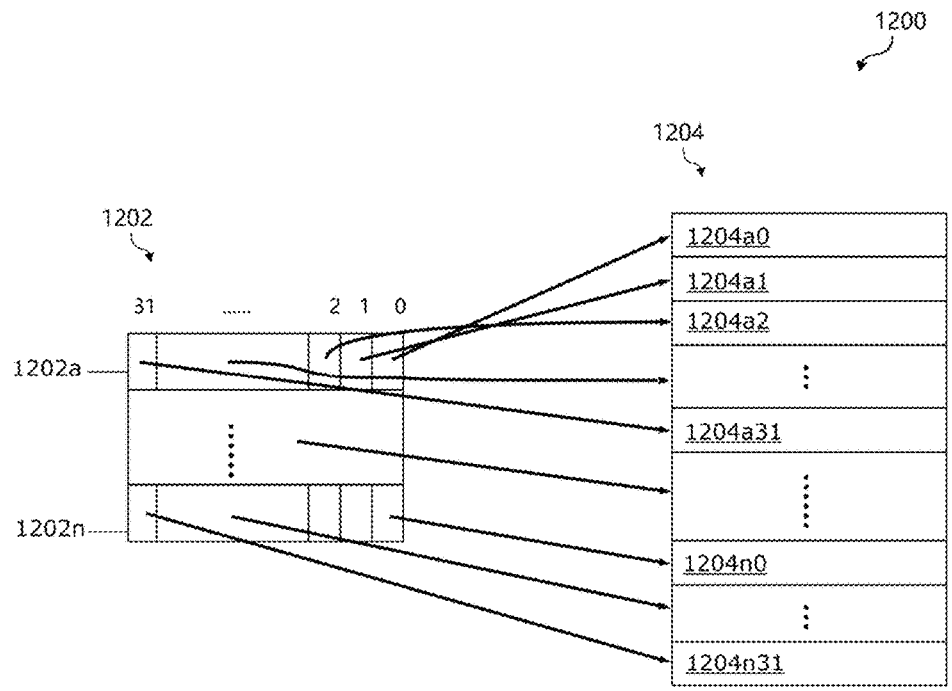
FIG. 12 schematically illustrates a block diagram of a mapping in one embodiment of the method of updating registers according to the present disclosure.

FIG. 12 schematically illustrates a mapping block diagram 1200 in an embodiment of the method of updating registers according to the present disclosure. Optionally, the step of establishing a mapping between each bit [31:0] in the bitmap register 1202a and the corresponding target content block in the one or more target registers 1204 includes: establishing a direct correspondence between each bit in bits [31:0] in the bitmap register 1202a and the corresponding target content blocks 1204a0-1204a31 in the one or more target registers.

In an embodiment of the present disclosure, the size of the target content block is fixed, wherein establishing the direct correspondence between each bit and the corresponding target content block in the one or more target registers includes establishing a correspondence between each bit and a start address of the corresponding target content block in the one or more target registers. As shown in FIG. 12, the bit at location 0 in the bitmap register 1202a may be mapped to the start address of the target content block 1204a0.

Figure 13:
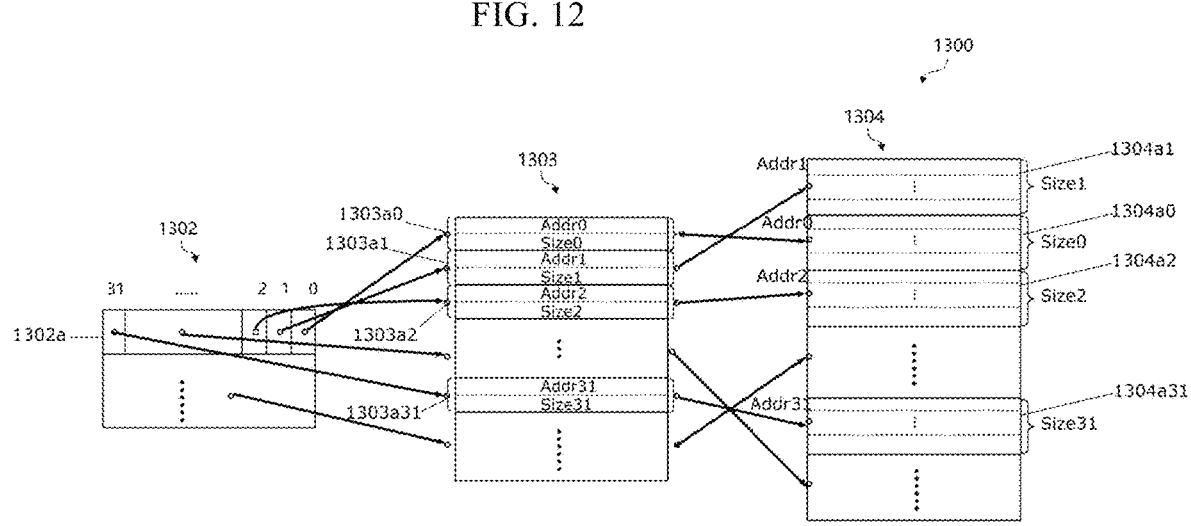
FIG. 13 schematically illustrates a block diagram of a mapping in another embodiment of the method of updating registers according to the present disclosure.

FIG. 13 schematically illustrates a block diagram 1300 of a mapping in another embodiment of the method of updating registers according to the present disclosure. In an alternative embodiment of the present disclosure, the method may also include providing one or more address mapping registers, such as 1303, each address mapping register includes one or more sets of content block address information, for example, the address mapping register 1303 includes content block address information 1303a0-1303a31 . . . . In an embodiment of the present disclosure, the step of establishing a mapping between each bit in the one or more bitmap registers and the corresponding target content block in the one or more target registers includes: establishing a correspondence between each bit in the one or more bitmap registers and a set of content block address information in the one or more address mapping registers; and establishing a correspondence between the group of content block address information in the one or more address mapping registers and the corresponding target content block in the one or more target registers, wherein the corresponding target content block is located according to the content block address information.

As shown in FIG. 13, the content block address information 1303a0 includes a content block start address Addr0 and a content block size Size0. Alternatively, the content block address information may include a content block start address and a content block end address (not shown).

In an embodiment of the present disclosure, the step of executing the register update instruction by the update controller according to the bits in the one or more bitmap registers to update the target content block in the one or more target registers, includes: for each bit in the one or more bitmap registers, locating the target content block corresponding to the bit according to the mapping; and in response to that the bit indicates the target content block corresponding to the bit needs to be updated, updating the target content block with the new content of the target content block. In this way, in the embodiments of the present disclosure, the content of a target content block in a register or a plurality of registers (e.g., a register group) can be updated quickly and reliably.

In a preferred embodiment of the present disclosure, the one or more flag bits are located in a header of the register update instruction. For example, depending on the number of target content blocks to be updated, the flag bits may be located in the first 1 word, 2 words or more words of the register update instruction.

It should be understood that the method of updating registers of the present disclosure is preferably used in embedded devices. The source of the new content may include one or more of memory, registers, and flash memory. More preferably, the update controller is a module in an embedded device, for example including but not limited to SPI controllers, I²S, I²C, DMA, UART and other modules. The embedded devices may include, for example, but are not limited to, MCUs. In this way, the method of updating registers of the present disclosure is executed by modules in the embedded device, does not occupy CPU resources, and can easily update registers of multiple modules in batches. In one embodiment, multiple modules in the embedded device are provided with their own register groups, and the current register values in the register groups reflect the current operating configurations of each module. The solution of the present disclosure can quickly and reliably update the register groups of multiple modules, so that the operating configurations of these modules can be switched quickly and in batches.

While various embodiments of various aspects of the present disclosure have been described for the purpose of the present disclosure, it shall not be understood that the teachings of the present disclosure are limited to these embodiments. The features disclosed in a specific embodiment are not limited to that embodiment, but may be combined with the features disclosed in different embodiments. For example, one or more features and/or operations of the apparatus or method according to the present disclosure described in one embodiment may also be applied in another embodiment individually, in combination or as a whole. Furthermore, it should be understood that the method steps described above may be performed sequentially, performed in parallel, combined into fewer steps, split into more steps, combined and/or omitted in ways other than those described. Those skilled in the art should appreciate that there are possibly more optional embodiments and modifications and various changes and modifications may be made to the above method steps, without departing from the scope defined by the claims of the disclosure.

What is claimed is:

1. A method for updating registers, comprising following steps:
   providing one or more bitmap registers;
   providing one or more target registers;
   establishing a mapping between each bit in the one or more bitmap registers and a corresponding target content block in the one or more target registers;
   providing a register update instruction, the register update instruction comprising:

one or more flag bits at specified locations, wherein each flag bit corresponds to a bit in the one or more bitmap registers, indicating whether the target content block corresponding to the bit needs to be updated;

wherein, for each target content block indicated by the bit that needs to be updated, the register update instruction further comprises a new content of the target content block or a source of the new content;

writing the one or more flag bits in the register update instruction into the one or more bitmap registers; and executing the register update instruction by an update controller according to the bit in the one or more bitmap registers to update the target content block in the one or more target registers, wherein only each target content block that needs to be updated as indicated by the bit is updated.

2. The method according to claim 1, wherein the step of establishing a mapping between each bit in the one or more bitmap registers and the corresponding target content block in the one or more target registers comprises: establishing a direct correspondence between each bit and the corresponding target content block in the one or more target registers.

3. The method according to claim 2, wherein a size of the target content block is fixed, wherein establishing a direct correspondence between each bit and the corresponding target content block in the one or more target registers comprises:

establishing a correspondence between each bit and a start address of the corresponding target content block in the one or more target registers.

4. The method according to claim 1, further comprising: providing one or more address mapping registers, each address mapping register comprising one or more sets of content block address information;

the step of establishing a mapping between each bit in the one or more bitmap registers and the corresponding target content block in the one or more target registers comprises:

establishing a correspondence between each bit in the one or more bitmap registers and a set of content block address information in the one or more address mapping registers; and establishing a correspondence between the set of content block address information in the one or more address mapping registers and the corresponding target content block in the one or more target registers, wherein the corresponding target content block is located according to the content block address information.

5. The method according to claim 4, wherein the content block address information comprises a content block start address and a content block size.

6. The method according to claim 4, wherein the content block address information comprises a content block start address and a content block end address.

7. The method according to claim 1, wherein the step of executing the register update instruction by the update controller according to the bit in the one or more bitmap registers to update the target content block in the one or more target registers according to the bit in the one or more bitmap registers, comprises:

for each bit in the one or more bitmap registers, locating the target content block corresponding to the bit according to the mapping; and in response to that the bit indicates whether the target content block corresponding to the bit needs to be updated, updating the target content block with the new content of the target content block.

8. The method according to claim 1, wherein the one or more flag bits are located in a header of the register update instruction.

9. The method according to claim 1, wherein the source of the new content comprises one or more of a memory, registers, and a flash memory.

10. The method according to claim 1, wherein the update controller is a module in an embedded device.

* * * * *